(12) United States Patent
Zhang

(10) Patent No.: US 10,264,579 B2
(45) Date of Patent: Apr. 16, 2019

(54) COMMUNICATION METHOD, USER EQUIPMENT, AND BASE STATION

(71) Applicant: Huawei Technologies Co., Ltd., Shenzhen (CN)

(72) Inventor: Yingyu Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 15/080,245

(22) Filed: Mar. 24, 2016

(65) Prior Publication Data

US 2016/0205692 A1    Jul. 14, 2016

Related U.S. Application Data

(63) Continuation of application No. PCT/CN2013/084429, filed on Sep. 27, 2013.

(51) Int. Cl.
*H04W 72/04* (2009.01)
*H04W 56/00* (2009.01)
(Continued)

(52) U.S. Cl.
CPC ....... *H04W 72/0453* (2013.01); *H04L 5/0037* (2013.01); *H04L 5/0053* (2013.01); *H04W 48/12* (2013.01); *H04W 56/001* (2013.01); *H04L 5/001* (2013.01); *H04L 5/0044* (2013.01); *H04W 56/00* (2013.01)

(58) Field of Classification Search
CPC ..... H04L 5/001; H04L 5/0037; H04L 5/0044; H04L 5/0053; H04W 48/12; H04W 56/00; H04W 56/001; H04W 72/0453
See application file for complete search history.

(56) References Cited

U.S. PATENT DOCUMENTS

2005/0085214 A1\* 4/2005 Laroia .................. H04L 5/0039
455/403
2009/0185475 A1\* 7/2009 Myung ............... H04L 27/2636
370/210
(Continued)

FOREIGN PATENT DOCUMENTS

CN    101370245 A    2/2009
CN    101848466 A    9/2010
(Continued)

*Primary Examiner* — Andrew Lai
*Assistant Examiner* — Harry H Kim
(74) *Attorney, Agent, or Firm* — Slater Matsil, LLP

(57) ABSTRACT

Embodiments of the present invention disclose a communication method, a UE, and a base station. The method includes: acquiring, by the user equipment UE, on an anchor carrier, synchronization information to synchronize with the base station, where a frequency resource between the UE and the base station includes N subcarriers, where the N subcarriers include the anchor carrier and at least one supplementary carrier, and N is an integer greater than or equal to 2; acquiring, by the UE, on the anchor carrier, system information, where the system information includes information about identities and frequency locations of the subcarriers; selecting, by the UE, the anchor carrier or a supplementary carrier according to the system information; and accessing, by the UE, the base station on a selected subcarrier, and communicating with the base station.

18 Claims, 8 Drawing Sheets

(51) Int. Cl.
*H04L 5/00* (2006.01)
*H04W 48/12* (2009.01)

(56) References Cited

U.S. PATENT DOCUMENTS

| | | | | |
|---|---|---|---|---|
| 2009/0296643 | A1* | 12/2009 | Cave | H04L 1/1812 |
| | | | | 370/329 |
| 2010/0227569 | A1* | 9/2010 | Bala | H04L 5/0007 |
| | | | | 455/73 |
| 2010/0232382 | A1* | 9/2010 | Gauvreau | H04W 72/02 |
| | | | | 370/329 |
| 2010/0272017 | A1* | 10/2010 | Terry | H04W 48/12 |
| | | | | 370/328 |
| 2012/0114014 | A1* | 5/2012 | Gaal | H04B 7/0404 |
| | | | | 375/135 |
| 2012/0213130 | A1* | 8/2012 | Zhang | H04L 5/001 |
| | | | | 370/280 |
| 2012/0218954 | A1* | 8/2012 | Barbieri | H04L 5/003 |
| | | | | 370/329 |
| 2013/0153298 | A1* | 6/2013 | Pietraski | E21B 7/04 |
| | | | | 175/45 |
| 2013/0165134 | A1* | 6/2013 | Touag | H04W 72/0486 |
| | | | | 455/452.1 |
| 2013/0260741 | A1* | 10/2013 | Yamada | H04W 24/00 |
| | | | | 455/422.1 |
| 2014/0200016 | A1* | 7/2014 | Siomina | H04W 24/08 |
| | | | | 455/450 |
| 2015/0215825 | A1* | 7/2015 | Kim | H04W 36/0088 |
| | | | | 370/331 |

FOREIGN PATENT DOCUMENTS

| | | |
|---|---|---|
| CN | 102215575 A | 10/2011 |
| WO | 2012104629 A2 | 8/2012 |
| WO | 2013027020 A1 | 2/2013 |

\* cited by examiner

COMMUNICATION METHOD, USER EQUIPMENT, AND BASE STATION

This application is a continuation of International Application No. PCT/CN2013/084429, filed on Sep. 27, 2013, which is hereby incorporated by reference in its entirety.

TECHNICAL FIELD

Embodiments of the present invention relate to the field of communications technologies, and in particular, to a communication method, a user equipment, and a base station.

BACKGROUND

With development of technologies such as the Internet of Things, the industry attaches increasing importance to machine to machine (M2M) communication, which is based on a Long Term Evolution (LTE) cellular technology. An M2M user equipment (UE) has strikingly different features than an existing human to human (H2H) user equipment, for example, there are numerous M2M user equipments. Communications systems in neither the existing LTE Rel.11 nor an earlier release consider features of the M2M communication, and few M2M user equipments are supported.

SUMMARY

In view of this, embodiments of the present invention provide a communication method, a user equipment UE, and a base station, which can better support M2M communication.

According to a first aspect, a communication method is provided, and includes: acquiring, by a user equipment UE, on an anchor carrier, synchronization information to synchronize with a base station, where a frequency resource between the UE and the base station includes N subcarriers, where the N subcarriers include the anchor carrier and at least one supplementary carrier, and N is an integer greater than or equal to 2; acquiring, by the UE, on the anchor carrier, system information, where the system information includes information about identities and frequency locations of the subcarriers; selecting, by the UE, the anchor carrier or a supplementary carrier according to the system information; and accessing, by the UE, the base station on a selected subcarrier, and communicating with the base station.

In a first possible implementation of the first aspect, a spacing between a downlink center frequency of the supplementary carrier and a downlink center frequency of the anchor carrier is an integral multiple of a frequency domain width of a resource block RB; and a spacing between an uplink center frequency of the supplementary carrier and an uplink center frequency of the anchor carrier is an integral multiple of the frequency domain width of the RB.

In a second possible implementation of the first aspect, a downlink center frequency of the anchor carrier coincides with a downlink center frequency of an LTE system; and a downlink center frequency of the supplementary carrier coincides with an orthogonal frequency division multiplexing OFDM subcarrier of the LTE system.

With reference to the second possible implementation of the first aspect, in a third possible implementation, the N subcarriers have same bandwidth and are evenly distributed on a frequency, and an offset of an uplink frequency relative to a downlink frequency of a subcarrier, among the N subcarriers, that deviates from the anchor carrier by i subcarriers is $W_{UL-DL}+i(\Delta_{UL}-\Delta_{DL})$, where $W_{UL-DL}$ is an offset of an uplink frequency relative to a downlink frequency of the anchor carrier, $\Delta_{UL}$ is an uplink frequency spacing between the N subcarriers, and $\Delta_{DL}$ is a downlink frequency spacing between the N subcarriers.

In a fourth possible implementation of the first aspect, the selecting, by the UE, the anchor carrier or a supplementary carrier according to the system information is specifically: randomly selecting, by the UE, one of the subcarriers according to an identity of the UE and the identities of the subcarriers.

With reference to the first aspect or any one of the first to fourth possible implementations of the first aspect, in a fifth possible implementation, the system information further includes information about a frequency hopping indication, a frequency hopping period, and a frequency hopping mode; and the communicating, by the UE, with the base station specifically includes: determining, by the UE according to the frequency hopping mode and the frequency hopping period, a subcarrier used to communicate with the base station at a next moment; and communicating, by the UE at the next moment, with the base station by using the determined subcarrier.

With reference to the first aspect or any one of the first to fourth possible implementations of the first aspect, in a sixth possible implementation, the communicating, by the UE, with the base station includes: receiving, by the UE on a physical downlink shared channel PDSCH, a packet sent by the base station, and selecting, by using a logical identity of the UE, data that is sent to the UE.

With reference to the first aspect or any one of the first to fourth possible implementations of the first aspect, in a seventh possible implementation, the system information further includes bandwidth of a cell-specific reference signal CRS, and the method further includes: determining, by the UE, a CRS sequence of the subcarrier according to a frequency location of the selected subcarrier and the bandwidth of the CRS.

With reference to the first aspect or any one of the first to seventh possible implementations of the first aspect, in an eighth possible implementation, the method further includes: receiving, by the UE, a handover command sent by the base station, where the handover command carries system information of a target cell; synchronizing with a target base station, according to the system information of the target cell and on an anchor carrier of the target cell; and accessing the target base station, on the anchor carrier of the target cell.

According to a second aspect, a communication method is provided, and includes: sending, by a base station, on an anchor carrier, synchronization information to a user equipment UE, so that the UE synchronizes with the base station, where a frequency resource between the base station and the UE includes N subcarriers, where the N subcarriers include the anchor carrier and at least one supplementary carrier, and N is an integer greater than or equal to 2; sending, by the base station, on the anchor carrier, system information to the UE, so that the UE selects the anchor carrier or one of the supplementary carriers according to the system information and accesses, on a selected subcarrier, the base station, where the system information includes information about an identity and a frequency location of the subcarrier; and communicating, by the base station, with the UE.

In a first possible implementation of the second aspect, a spacing between a downlink center frequency of the supplementary carrier and a downlink center frequency of the anchor carrier is an integral multiple of a frequency domain width of a resource block RB; and a spacing between an uplink center frequency of the supplementary carrier and an uplink center frequency of the anchor carrier is an integral multiple of the frequency domain width of the RB.

In a second possible implementation of the second aspect, a downlink center frequency of the anchor carrier coincides with a downlink center frequency of an LTE system; and a downlink center frequency of the supplementary carrier coincides with an orthogonal frequency division multiplexing OFDM subcarrier of the LTE system.

With reference to the second possible implementation of the second aspect, in a third possible implementation, the N subcarriers have same bandwidth and are evenly distributed on a frequency, and an offset of an uplink frequency relative to a downlink frequency of a subcarrier, among the N subcarriers, that deviates from the anchor carrier by i subcarriers is $W_{UL-DL}+i(\Delta_{UL}-\Delta_{DL})$, where $W_{UL-DL}$ is an offset of an uplink frequency relative to a downlink frequency of the anchor carrier, $\Delta_{UL}$ is an uplink frequency spacing between the N subcarriers, and $\Delta_{DL}$ is a downlink frequency spacing between the N subcarriers.

With reference to the second aspect or any one of the first to third possible implementations of the second aspect, in a fourth possible implementation, the system information includes information about a frequency hopping indication, a frequency hopping period, and a frequency hopping mode; and the communicating, by the base station, with the UE specifically includes: determining, by the base station according to the frequency hopping mode and the frequency hopping period, a subcarrier used to communicate with the UE at a next moment; and communicating, by the base station at the next moment, with the UE by using the subcarrier.

With reference to the second aspect or any one of the first to third possible implementations of the second aspect, in a fifth possible implementation, the communicating, by the base station, with the UE specifically includes: sending, by the base station, data of multiple UEs on a physical downlink shared channel PDSCH.

With reference to the second aspect or any one of the first to third possible implementations of the second aspect, in a sixth possible implementation, the system information further includes bandwidth of a cell-specific reference signal CRS.

With reference to the second aspect or any one of the first to sixth possible implementations of the second aspect, in a seventh possible implementation, the method further includes: sending, by the base station, a handover command to the UE, where the handover command carries system information of a target cell.

According to a third aspect, a user equipment UE is provided, where the UE includes: a synchronization module, configured to acquire, on an anchor carrier, synchronization information to synchronize with a base station, where a frequency resource between the UE and the base station includes N subcarriers, where the N subcarriers include the anchor carrier and at least one supplementary carrier, and N is an integer greater than or equal to 2; a receiving module, configured to acquire, on the anchor carrier, system information, where the system information includes information about identities and frequency locations of the subcarriers; a determining module, configured to select the anchor carrier or one of the supplementary carriers according to the system information; and an access module, configured to access, on a selected subcarrier, the base station, and communicate with the base station.

In a first possible implementation of the third aspect, the determining module is specifically configured to randomly select one of the subcarriers according to an identity of the UE and the identities of the subcarriers.

In a second possible implementation of the third aspect, the system information further includes information about a frequency hopping indication, a frequency hopping period, and a frequency hopping mode; and the access module is specifically configured to determine, according to the frequency hopping mode and the frequency hopping period, a subcarrier used to communicate with the base station at a next moment; and communicate, at the next moment, with the base station by using the determined subcarrier.

In a third possible implementation of the third aspect, the access module includes: a sending unit, configured to send an access request to the base station by using a physical random access channel PRACH on the selected subcarrier; and a receiving unit, configured to receive, on the selected subcarrier, an access response sent by the base station.

In a fourth possible implementation of the third aspect, the receiving module is further configured to receive, on the selected subcarrier, notification information that is sent by the base station when the system information changes, and receive, according to the notification information and on the anchor carrier, the changed system information.

With reference to the third aspect or any one of the first to fourth possible implementations of the third aspect, in a fifth possible implementation, the receiving module is further configured to receive a handover command sent by the base station, where the handover command carries system information of a target cell; and the UE further includes a first handover module, where the first handover module is configured to synchronize with a target base station, according to the system information of the target cell and on an anchor carrier of the target cell, and access, on the anchor carrier of the target cell, the target base station.

With reference to the third aspect or any one of the first to fourth possible implementations of the third aspect, in a sixth possible implementation, the UE further includes an acquiring module, configured to acquire bandwidth of a cell-specific reference signal CRS; and determine a CRS sequence of the subcarrier according to a frequency location of the selected subcarrier and the bandwidth of the CRS.

According to a fourth aspect, a base station is provided, where the base station includes: a sending module, configured to send, on an anchor carrier, synchronization information to a user equipment UE, so that the UE synchronizes with the base station, where a frequency resource between the UE and the base station includes N subcarriers, where the N subcarriers include the anchor carrier and at least one supplementary carrier, and N is an integer greater than or equal to 2; where the sending module is further configured to send, on the anchor carrier, system information to the UE, where the system information includes information about identities and frequency locations of the N subcarriers, so that the UE selects the anchor carrier or one of the supplementary carriers according to the system information; and a communications module, configured to enable, on a subcarrier selected by the UE, the UE to access the base station; and communicate with the UE.

In a first possible implementation of the fourth aspect, the system information further includes information about a frequency hopping indication, a frequency hopping period, and a frequency hopping mode; and the communications module is specifically configured to communicate with the UE according to the frequency hopping mode and the frequency hopping period.

In a second possible implementation of the fourth aspect, the sending module is further configured to send, on the N subcarriers, notification information when the system information changes, so that the UE receives, on the anchor carrier, the changed system information.

In a third possible implementation of the fourth aspect, the sending module is further configured to send a handover command to the UE, where the handover command carries system information of a target cell, so that the UE synchronizes, on an anchor carrier of the target cell, with a target base station, and accesses, on the anchor carrier of the target cell, the target base station.

With reference to the fourth aspect or the first to third possible implementations of the fourth aspect, in a fourth possible implementation, the system information further includes bandwidth of a cell-specific reference signal CRS.

In a fifth possible implementation of the fourth aspect, the communications module is specifically configured to map data of multiple UEs into a single physical downlink shared channel PDSCH packet and send the packet to the UE.

In a sixth possible implementation of the fourth aspect, the system information further includes configuration information of a channel state information-reference signal CSI-RS that is used for a normal user equipment NUE communication mode, where the normal user equipment is a user equipment that supports human to human communication; and the communications module is specifically configured to communicate with the UE, on a subcarrier selected by the UE, where a resource occupied by the CSI-RS is removed from the subcarrier.

In a seventh possible implementation of the fourth aspect, the system information further includes configuration information of a detection measurement signal SRS that is used for a normal user equipment NUE communication mode, where the normal user equipment is a user equipment that supports human to human communication; and the communications module is specifically configured to receive, in an uplink subframe of a subcarrier selected by the UE, uplink data sent by the UE, where a resource occupied by the SRS is removed from the subcarrier.

Based on the foregoing technical solutions, in embodiments of the present invention, a frequency resource between a base station and a UE is divided into N subcarriers. The UE synchronizes, on an anchor carrier among the N subcarriers, with the base station; receives, on the anchor carrier, system information sent by the base station; and selects a subcarrier to access the base station, and communicates with the base station. In this way, in M2M communication, when the number of UEs is relatively large, different UEs may access the base station by using different subcarriers and communicate with the base station, thereby better supporting the M2M communication.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), and a Worldwide Interoperability for Microwave Access (WiMAX) communications system.

It should be further understood that, in the embodiments of the present invention, a normal user equipment (NUE)

indicates a user equipment that supports H2H communication; and a machine user equipment (MUE) indicates a user equipment that supports M2M communication. A user equipment may be both an NUE and an MUE, and may also be only an NUE or an MUE. A user equipment may be referred to as a terminal, a mobile station (MS), a mobile terminal, or the like. The user equipment may communicate with one or more core networks by using a radio access network (RAN). For example, the user equipment may be a mobile phone (or referred to as a "cellular" phone), or a computer with a mobile terminal; for example, the user equipment may also be a portable, pocket-sized, handheld, computer built-in, or vehicle-mounted mobile apparatus, and exchange voice or data with a radio access network.

In the embodiments of the present invention, a base station may be a base station (BTS) in GSM or CDMA, may also be a base station (NB) in WCDMA, and may further be an evolved NodeB (eNB, or eNodeB) in LTE, which is not limited in the present invention.

Figure 1:
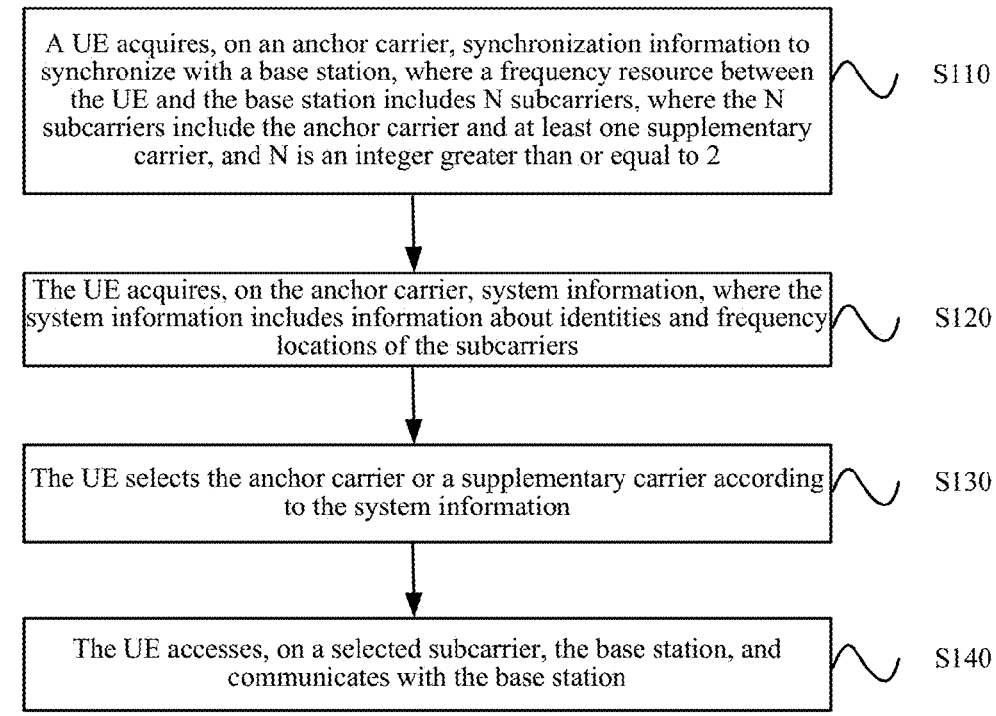
FIG. 1 is a flowchart of a communication method according to an embodiment of the present invention.

FIG. 1 shows a schematic flowchart of a communication method 100 according to an embodiment of the present invention. As shown in FIG. 1, the method 100 includes:

S110. A UE acquires, on an anchor carrier, synchronization information to synchronize with a base station, where a frequency resource between the UE and the base station includes N subcarriers, where the N subcarriers include the anchor carrier and at least one supplementary carrier, and N is an integer greater than or equal to 2.

S120. The UE acquires, on the anchor carrier, system information, where the system information includes information about identities and frequency locations of the subcarriers.

S130. The UE selects the anchor carrier or a supplementary carrier according to the system information.

S140. The UE accesses the base station on a selected subcarrier, and communicates with the base station.

In this embodiment of the present invention, to increase system capacity, the frequency resource between the base station and the UE in an LTE system is divided into N subcarriers. The UE synchronizes with the base station by using the anchor carrier among the N subcarriers; receives, from the anchor carrier, system information sent by the base station; and selects a subcarrier to access the base station, and communicates with the base station. In this way, in M2M communication, when the number of UEs is relatively large, different UEs may access the base station on different subcarriers and communicate with the base station, so that communication with more UEs may be supported and system capacity may be expanded.

It should be noted that, in this embodiment of the present invention, the subcarrier and an orthogonal frequency division multiplexing OFDM subcarrier in the existing LTE system are different concepts. Each subcarrier may include one or more OFDM subcarriers; and the multiple subcarriers are not orthogonal.

For ease of description, the following uses the existing LTE system as an example to describe distribution of the foregoing N subcarriers on a frequency.

Figure 2:
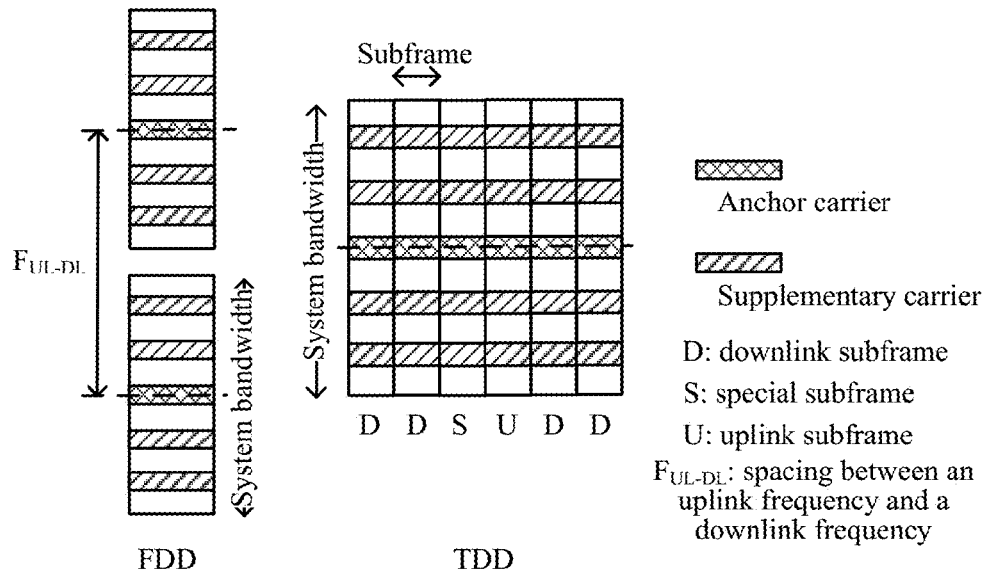
FIG. 2 is a schematic diagram of a subcarrier according to an embodiment of the present invention.

For example, as shown in FIG. 2, in existing system bandwidth deployed for an NUE, a frequency resource may be divided into multiple subcarriers. For an FDD system, each subcarrier consists of a downlink subcarrier and an uplink subcarrier. For a TDD system, each subcarrier consists of a downlink subframe and an uplink subframe as it has a same frequency domain resource location when in uplink and downlink subframes.

In this embodiment of the present invention, optionally, the anchor carrier among the N subcarriers may be located at a central location of a working frequency of the LTE system. A spacing between a downlink center frequency of the central subcarrier and a downlink center frequency of another subcarrier is an integral multiple of a frequency domain width of a resource block RB; and a spacing between an uplink center frequency of the central subcarrier and an uplink center frequency of N non-central subcarriers is an integral multiple of the frequency domain width of an RB. The UE determines the central subcarrier, that is, the anchor carrier, according to a received location of a downlink synchronization channel, and receives the system information by using the anchor carrier.

The N subcarriers defined among LTE system resources are used as an example to describe distribution of a frequency domain of the subcarriers. By way of example and not by way of limitation, the anchor carrier is located at a center of a frequency domain of the LTE system.

The downlink center frequency of the anchor carrier coincides with a downlink center frequency of the existing LTE system, which is represented as FDL-Center. A minimum step used by a terminal to search for a frequency of a radio frequency (RF) is Wstep; and a spacing WDL between a downlink center frequency of each supplementary carrier and the downlink center frequency FDL-Center of the anchor carrier is an integral multiple of a frequency domain width WRB of an RB, that is, $$W_{DL} \bmod LCM(W_{RB}, W_{step}) = 0 \qquad (1)$$

where, mod is a modulo operation; $W_{RB}$ is a frequency domain width of an RB; and LCM is an operation of computing a least common multiple.

In a process of determining a location of a downlink center frequency of the subcarrier, a bandwidth size $W_{BW}$ of the subcarrier further needs to be considered. In other words, for two subcarriers adjacent to each other in the frequency domain, a spacing between center frequencies of the two subcarriers is not less than ½ of a sum of bandwidths of the two subcarriers.

For example, if $W_{step}=100$ kHz, $W_{RB}=180$ kHz, and $W_{BW}=6\times180$ kHz, the frequency domain spacing $W_{DL}$, which is determined in this embodiment, between the downlink center frequency of the subcarrier and the downlink center frequency $F_{DL-Center}$ of the anchor carrier is:

$$W_{DL} \bmod 900 = 0 \text{ and } W_{DL} \geq W_{BW},$$

in this case, an obtained value of $W_{DL}$ is n×900 kHz, where n≥2.

For example, if $W_{step}=7.5$ kHz, $W_{RB}=180$ kHz, and $W_{BW}=6\times180$ kHz, the frequency domain spacing $W_{DL}$, which is determined in this embodiment, between the downlink center frequency of the subcarrier and the downlink center frequency $F_{DL-Center}$ of the anchor carrier is:

$$W_{DL} \bmod 180 = 0 \text{ and } W_{DL} \geq W_{BW},$$

in this case, the value of $W_{DL}$ is n×180 kHz, where n≥6.

In the uplink, a spacing between the uplink center frequency of each supplementary carrier and the uplink center frequency of the anchor carrier is an integral multiple of a frequency domain width of an RB. None of center frequencies of all subcarriers coincides with any OFDM subcarrier of the LTE system. All subcarriers have same bandwidth, that is, they have the same number of OFDM subcarriers. A spacing $W_{UL}$ between the uplink center frequency of the supplementary carrier and a center frequency of the anchor carrier is an integral multiple of the frequency domain width $W_{RB}$ of an RB, that is, $$W_{UL} \bmod LCM(W_{RB}, W_{step}) = 0 \tag{2}$$

In a process of determining a location of an uplink center frequency of the subcarrier, the bandwidth size $W_{BW}$ of the subcarrier further needs to be considered. In other words, for two subcarriers adjacent to each other in the frequency domain, the spacing between center frequencies of the two subcarriers is not less than ½ of the sum of bandwidths of the two subcarriers.

For example, if $W_{step}=100$ kHZ, $W_{RB}=180$ kHZ, and $W_{BW}=6 \times 180$ kHZ, the frequency domain spacing $W_{UL}$ between the uplink center frequency of the supplementary carrier and an uplink center frequency $F_{UL-Center}$ of the anchor carrier is:

$$W_{UL} \bmod 900=0 \text{ and } W_{UL} \geq W_{BW},$$

in this case, an obtained value of $W_{UL}$ is $n \times 900$ kHz, where $n \geq 2$.

For example, if $W_{step}=7.5$ kHZ, $W_{RB}=180$ kHZ, and $W_{BW}=6 \times 180$ kHZ, the frequency domain spacing $W_{UL}$ between the uplink center frequency of the supplementary carrier and the uplink center frequency $F_{UL-Center}$ of the anchor carrier is:

$$W_{UL} \bmod 180=0 \text{ and } W_{UL} \geq W_{BW},$$

in this case, the value of $W_{UL}$ is $n \times 180$ kHz, where $n \geq 6$.

Figure 3:
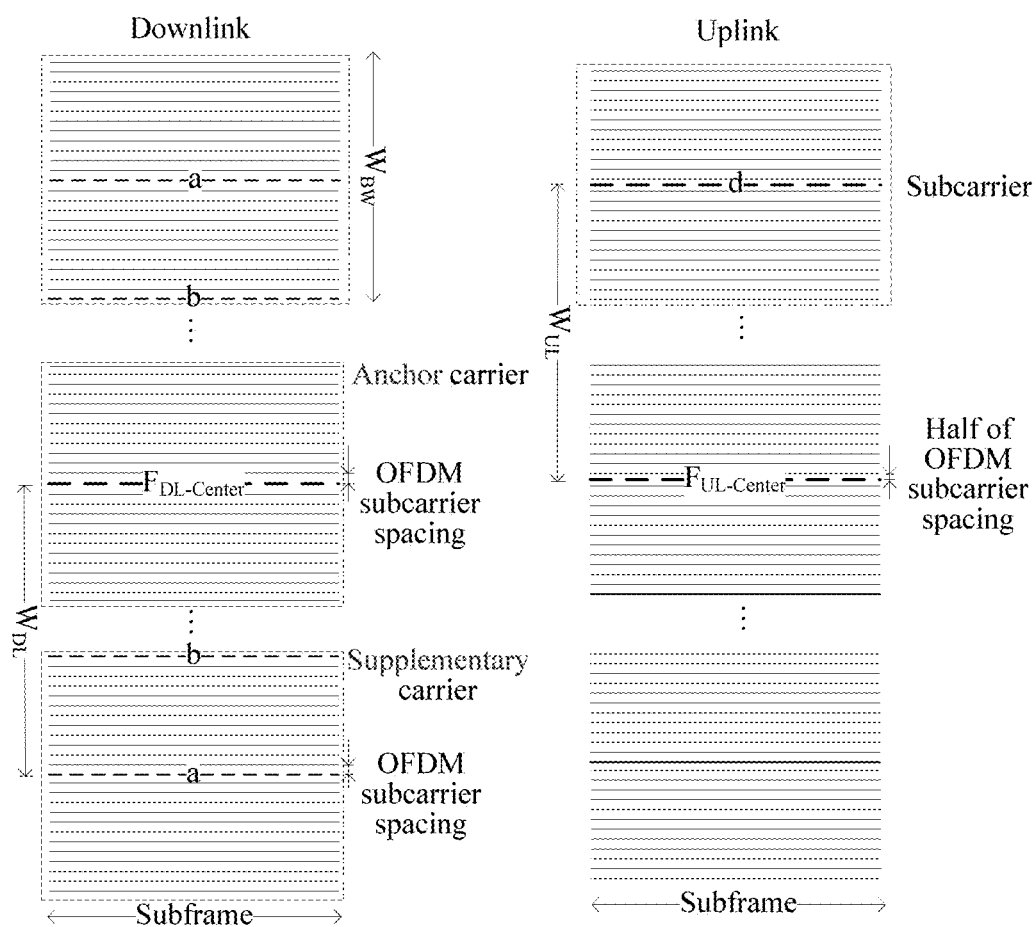
FIG. 3 is a schematic diagram illustrating frequency distribution of a subcarrier according to an embodiment of the present invention.

In FIG. 3, distribution of an uplink frequency and a downlink frequency of each subcarrier is based on the example in which bandwidth of each subcarrier is a frequency domain width of two RBs. It should be noted that this example is merely intended to help a person skilled in the art better understand the distribution of the uplink frequency and the downlink frequency of each subcarrier in this embodiment of the present invention. The bandwidth of each subcarrier is not limited in this embodiment of the present invention, and may also be another value, for example, a frequency domain width of 6 RBs.

As shown in FIG. 3, in the downlink, the downlink center frequency of the anchor carrier coincides with the downlink center frequency $F_{DL-Center}$ of the LTE system; a downlink center frequency of a supplementary carrier that is not at the central location also coincides with an OFDM subcarrier of the LTE system, for example, an OFDM subcarrier a in FIG. 3. A spacing between a downlink center frequency of each subcarrier and the downlink center frequency $F_{DL-Center}$ of the anchor carrier is an integral multiple of a frequency domain width of an RB.

Considering impact of factors such as zero-IF receiver on a terminal side, a direct current carrier in the existing LTE system does not carry any symbol information. For a subcarrier which is among the subcarriers and whose center frequency does not coincide with a center frequency of the LTE system, an issue of the direct current (DC) also needs to be considered.

For the base station, no data symbol is carried on a center frequency of each subcarrier (such as $F_{DL-Center}$ of the anchor carrier, the subcarrier a of the supplementary carrier). In addition, a conflict occurs in an OFDM subcarrier b on an edge of the subcarrier due to a difference between the subcarrier and a physical resource block (PRB) that is defined by the LTE system. The base station also does not use the OFDM subcarrier b, in which the conflict occurs, to carry a data symbol. In other words, in an MUE communication mode, the base station performs rate matching of MUE data and mapping of data symbols on the subcarrier except the OFDM subcarrier a and the OFDM subcarrier b; In addition, none of MUEs performs symbol detection on the OFDM subcarrier a and the OFDM subcarrier b.

As shown in FIG. 3, in the uplink, none of uplink center frequencies (the uplink center frequency $F_{UL-Center}$ of the anchor carrier, an uplink center frequency d of the supplementary carrier) of all subcarriers coincides with any OFDM subcarrier of the LTE system. All subcarriers have same bandwidth, that is, they have the same number of OFDM subcarriers. The spacing between the uplink center frequency of each supplementary carrier and the uplink center frequency of the anchor carrier is an integral multiple of a frequency domain width of an RB.

Figure 4:
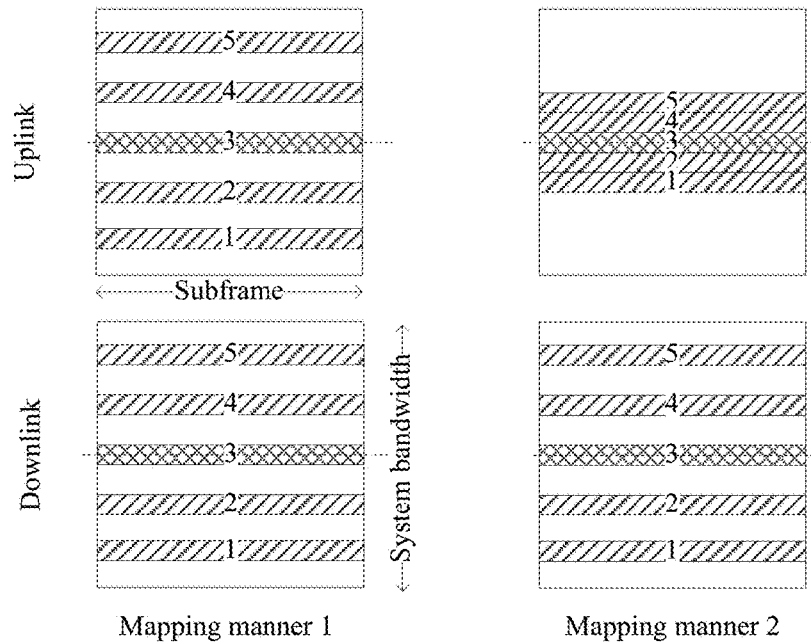
FIG. 4 is a schematic diagram illustrating a mapping manner of a subcarrier according to an embodiment of the present invention.

In this embodiment of the present invention, optionally, uplink frequency spectrum occupied by an uplink carrier of each subcarrier may be spaced apart from each other, that is, an uplink frequency spectrum resource is split into multiple segments (as shown in a mapping manner 1 in FIG. 4); and uplink frequency spectrum occupied by the uplink carrier of each subcarrier may also be contiguous to each other (as shown in a mapping manner 2 in FIG. 4).

In this embodiment of the present invention, optionally, in a case in which each subcarrier has same bandwidth and is evenly distributed on a frequency, an offset of an uplink frequency relative to a downlink frequency of a subcarrier, among the N subcarriers, that deviates from the anchor carrier by i subcarriers is $W_{UL-DL}+i(\Delta_{UL}-\Delta_{DL})$, where $W_{UL-DL}$ is an offset of the uplink center frequency of the anchor carrier relative to the downlink center frequency thereof, $\Delta_{UL}$ is an uplink frequency spacing between each subcarrier, and $\Delta_{DL}$ is a downlink frequency spacing between each subcarrier.

Figure 5A:
FIG. 5A to FIG. 5D are schematic diagrams illustrating a relationship between an uplink frequency and a downlink frequency of a subcarrier according to an embodiment of the present invention.
Figure 5B:
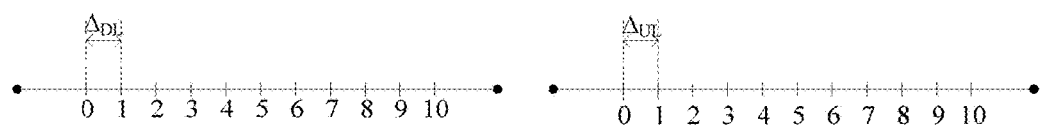

Specifically, as shown in FIG. 5A and FIG. 5B, the downlink frequency spacing $\Delta_{DL}$ indicates a downlink frequency spacing between adjacent subcarriers; and the uplink frequency spacing $\Delta_{UL}$ indicates an uplink frequency spacing between adjacent subcarriers. $\Delta_{DL}$ and $\Delta_{UL}$ may be same (as shown in the mapping manner 1 in FIG. 4) or be different (as shown in the mapping manner 2 in FIG. 4).

In FIG. 5A and FIG. 5B, different numbering schemes are adopted for the subcarriers. In FIG. 5A, an ID of the anchor carrier is zero; an ID of a supplementary carrier whose frequency is higher than a frequency of the anchor carrier is a positive value; and an ID of a supplementary carrier whose frequency is lower than the frequency of the anchor carrier is a negative value. In FIG. 5B, the N subcarriers are numbered according to an order of frequency level. The ID of the anchor carrier is 5. It should be understood that a numbering scheme of the N subcarriers is not limited in this embodiment of the present invention. The numbering schemes in FIG. 5A and FIG. 5B are merely exemplary.

Figure 5C:
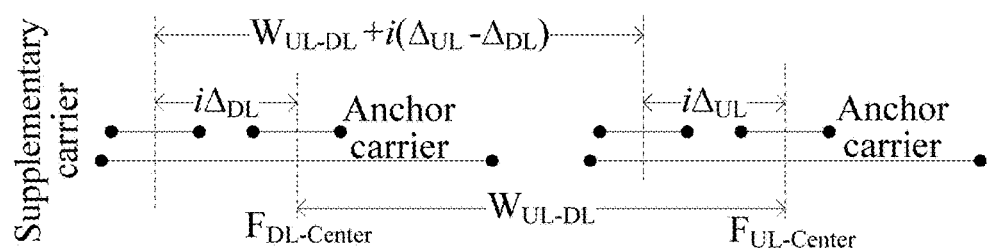

As shown in FIG. 5C, in this embodiment, an offset of an uplink frequency relative to a downlink frequency of a subcarrier that deviates from the anchor carrier by i subcarriers is $W_{UL-DL}+i(\Delta_{UL}-\Delta_{DL})$. It should be understood that if a frequency of the supplementary carrier is higher than a frequency of the anchor carrier, i is a positive value; if the frequency of the supplementary carrier is lower than the frequency of the anchor carrier, i is a negative value; and if the subcarrier is the anchor carrier, i is zero. With reference to FIG. 3, FIG. 5A, and FIG. 5B, the uplink frequency of the subcarrier that deviates from the anchor carrier by i subcarriers is $F_{UL-Center}+i\Delta_{UL}$, and the downlink frequency is $F_{DL-Center}+i\Delta_{DL}$. Therefore, the offset of the uplink frequency relative to the downlink frequency is:

$$F_{UL-Center} + i\Delta_{UL} - (F_{DL-Center} + i\Delta_{DL}) = \tag{3}$$

-continued $$F_{UL-Center} - F_{DL-Center} + i\Delta_{UL} - i\Delta_{DL} = W_{UL-DL} + i(\Delta_{UL} - \Delta_{DL})$$

$W_{UL-DL}$ is the offset of the uplink center frequency of the anchor carrier relative to the downlink center frequency thereof. In an FDD system, $W_{UL-DL}$ is not zero; in a TDD system, $W_{UL-DL}$ is zero.

In another embodiment of the present invention, optionally, the spacing between the downlink center frequency of each supplementary carrier, except the anchor carrier, and the downlink center frequency of the anchor carrier is an integral multiple of a frequency domain width of an RB plus a half of an OFDM subcarrier spacing; and the spacing between the uplink center frequency of each supplementary carrier and the uplink center frequency of the anchor carrier is an integral multiple of a frequency domain width of an RB.

The LTE system is used as an example. The downlink center frequency of the anchor carrier coincides with the downlink center frequency of the LTE system, which is represented as $F_{DL-Center}$. A minimum step used by a terminal to search for a frequency of an RF is $W_{step}$; and the spacing $W_{DL}$ between the downlink center frequency of the supplementary carrier and the downlink center frequency $F_{DL-Center}$ of the anchor carrier is an integral multiple of the frequency domain width $W_{RB}$ of an RB plus a half of a subcarrier spacing, that is, $$W_{DL} \bmod LCM(W_{RB}, W_{step}) = C/2 \quad (4)$$

where, C is the OFDM subcarrier spacing.

In a process of determining a location of the downlink center frequency of the subcarrier, the bandwidth size $W_{BW}$ of the subcarrier further needs to be considered. In other words, for two subcarriers adjacent to each other in the frequency domain, a spacing between center frequencies of the two subcarriers is not less than ½ of the sum of bandwidths of the two subcarriers.

For example, if $W_{step}=7.5$ kHz, $W_{RB}=180$ kHz, and $W_{BW}=6\times180$ kHz, the frequency domain spacing $W_{DL}$, which is determined in this embodiment, between the downlink center frequency of the subcarrier and the downlink center frequency $F_{DL-Center}$ of the anchor carrier is:

$$W_{DL} \bmod 180 = 7.5 \text{ and } W_{DL} \geq W_{BW},$$

in this case, a value of $W_{DL}$ is n×180+7.5 kHz, where n≥16.

In the uplink, as described above, the spacing between an uplink center frequency of each subcarrier and the uplink center frequency of the anchor carrier is an integral multiple of a frequency domain width of an RB. Details are not described herein again.

Figure 6:
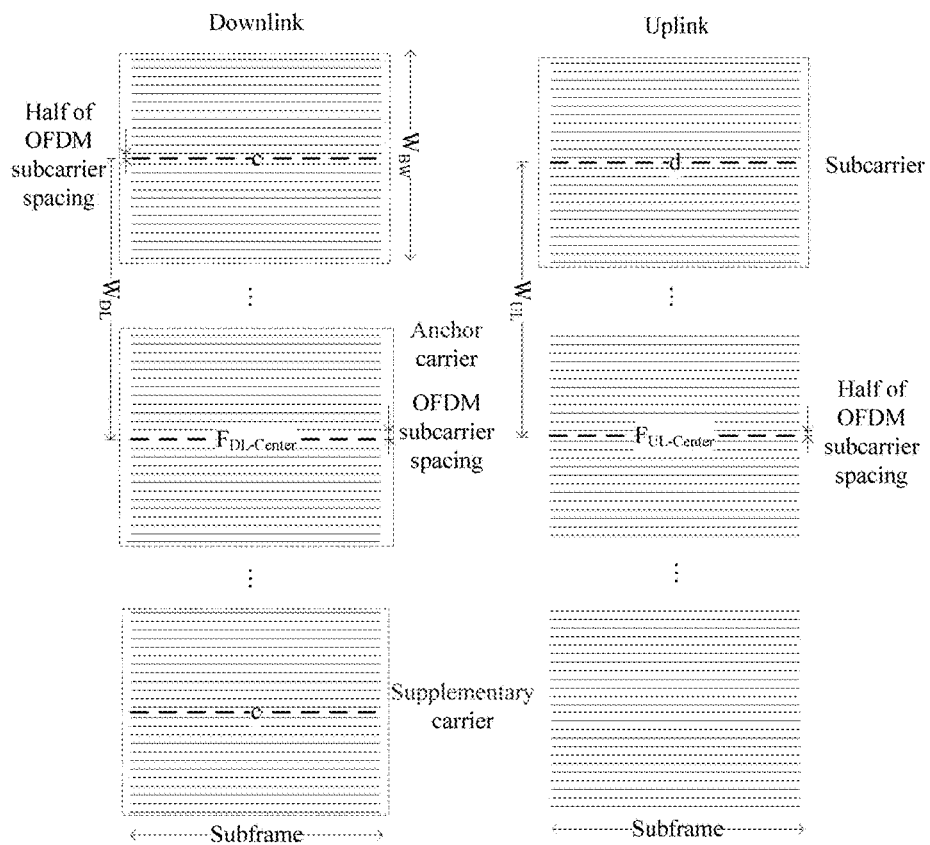
FIG. 6 is a schematic diagram illustrating frequency distribution of another subcarrier according to an embodiment of the present invention.

FIG. 6 shows distribution of an uplink frequency and a downlink frequency of each subcarrier in this embodiment. In the example of FIG. 6, bandwidth of each subcarrier is a frequency domain width of two RBs. It should be noted that this example is merely intended to help a person skilled in the art better understand the distribution of the uplink frequency and the downlink frequency of each subcarrier in this embodiment of the present invention. The bandwidth of each subcarrier is not limited in this embodiment of the present invention, and may also be another value, for example, a frequency domain width of 6 RBs.

As shown in FIG. 6, in the downlink, the downlink center frequency of the anchor carrier coincides with the downlink center frequency $F_{DL-Center}$ of the LTE system; a downlink center frequency of a subcarrier that is not at a central location does not coincide with an OFDM subcarrier of the LTE system, but is in the middle of two adjacent OFDM subcarriers of the LTE system, for example, an OFDM subcarrier c in FIG. 6. The spacing between the downlink center frequency of the supplementary carrier and the downlink center frequency $F_{DL-Center}$ of the anchor carrier is an integral multiple of a frequency domain width of an RB plus a half of an OFDM subcarrier spacing.

As shown in FIG. 6, in the uplink, as described above, the spacing between the uplink center frequency of each subcarrier and the uplink center frequency of the anchor carrier is an integral multiple of a frequency domain width of an RB. Details are not described herein again.

In this embodiment of the present invention, optionally, an offset of an uplink frequency relative to a downlink frequency of a subcarrier that deviates from the anchor carrier by i subcarriers is $W_{UL-DL}+i(\Delta_{UL}-\Delta_{DL})-\text{sign}(i)\times C/2$, where $W_{UL-DL}$ is an offset of the uplink center frequency of the anchor carrier relative to the downlink center frequency thereof, $\Delta_{UL}$ is a parameter indicating an uplink frequency spacing between the subcarriers, $\Delta_{DL}$ is a parameter indicating a downlink frequency spacing between the subcarriers, and C is the OFDM subcarrier spacing.

Figure 5D:
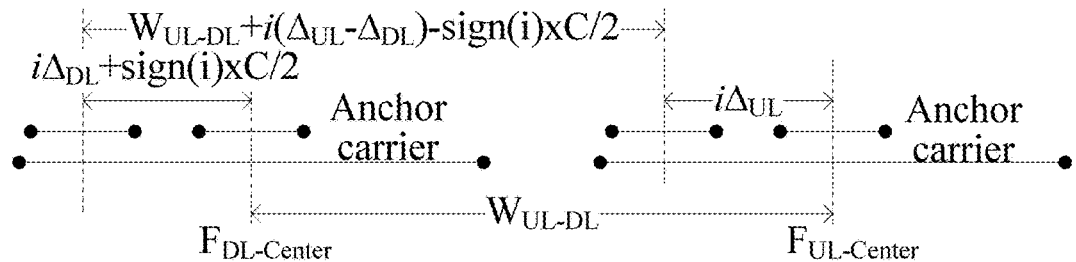

As shown in FIG. 5D, in this embodiment, the offset of the uplink frequency relative to the downlink frequency of the subcarrier that deviates from the anchor carrier by i subcarriers is $W_{UL-DL}+i(\Delta_{UL}-\Delta_{DL})-\text{sign}(i)\times C/2$, where, sign(x) is a sign function, that is:

sign(x)=1, x>0
sign(x)=0, x=0
sign(x)=−1, x<0

It should be understood that if a frequency of the subcarrier is higher than a frequency of the anchor carrier, i is a positive value; if the frequency of the subcarrier is lower than the frequency of the anchor carrier, i is a negative value; and if the subcarrier is the anchor carrier, i is zero. With reference to FIG. 6, FIG. 5A, and FIG. 5B, the uplink frequency of the subcarrier that deviates from the anchor carrier by i subcarriers is $F_{UL-Center}+i\Delta_{UL}$, and the downlink frequency is $F_{DL-Center}+i\Delta_{DL}+\text{sign}(i)\times C/2$. Therefore, the offset of the uplink frequency relative to the downlink frequency is:

$$F_{UL-Center} + i\Delta_{UL} - (F_{DL-Center} + i\Delta_{DL} + \text{sign}(i) \times C/2) = \quad (5)$$
$$F_{UL-Center} - F_{DL-Center} + i\Delta_{UL} - i\Delta_{DL} - \text{sign}(i) \times C/2 =$$
$$W_{UL-DL} + i(\Delta_{UL} - \Delta_{DL}) - \text{sign}(i) \times C/2$$

$W_{UL-DL}$ is the offset of the uplink center frequency of the anchor carrier relative to the downlink center frequency thereof. In an FDD system, $W_{UL-DL}$ is not zero; in a TDD system, $W_{UL-DL}$ is zero.

Frequency distribution of the subcarrier is described above. The following describes a physical channel carried by the subcarrier.

Figure 7:
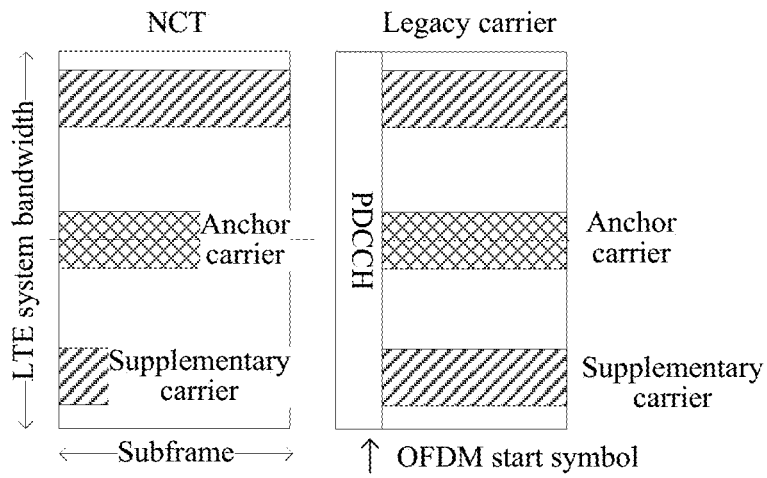
FIG. 7 is a schematic diagram of a subcarrier according to an embodiment of the present invention.

A physical broadcast channel (PBCH) defined for the existing Rel.11 LTE system uses a cell-specific reference signal (CRS) as a demodulation pilot, and is applicable to a carrier type defined prior to Rel.10, which may be referred to as legacy carrier. A new carrier type is introduced in Rel.11, that is, a new carrier type (NCT). When it is mentioned that a carrier type is different, it may mean that two different carriers have different carrier types at a same moment, or it may mean that a same carrier has different carrier types at different moments. For ease of description, in the example of FIG. 7, the anchor carrier is a subcarrier located at a central location of an LTE working frequency.

In this embodiment of the present invention, optionally, the N subcarriers and the LTE system share a same subframe number, frame number, and subframe type (normal or extended). Each subcarrier shares a same cell ID as the existing LTE system. Each subcarrier reuses an uplink and a downlink sequence generating manner of an NUE, which includes sequences or pilots, such as a CRS, a CSI-RS, an SRS, a demodulation reference signal (DMRS), and a random access channel (RACH).

Optionally, the UE acquires, on each subcarrier, control information and scheduling information related to a physical layer by using an enhanced physical downlink control channel (EPDCCH). The EPDCCH and a PDSCH use a same OFDM start symbol, which is predefined or determined by means of PBCH broadcasting.

Figure 8:
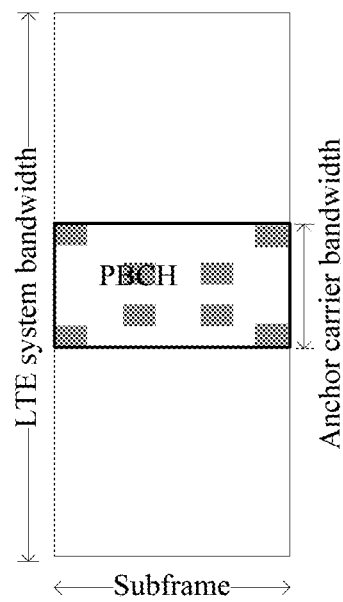
FIG. 8 is a schematic diagram of a physical channel of a subcarrier according to an embodiment of the present invention.

Optionally, each subcarrier may allocate a predefined number of PRBs or all PRBs to other physical channels, such as a broadcast channel PBCH, a paging channel (Paging Channel, PCH), and a downlink data channel PDSCH at a granularity of an enhanced control channel element (ECCE) or an enhanced resource element group (EREG), as shown in grey areas in a schematic diagram of FIG. 8. In this way, a fixed number of ECCEs (or EREGs) at a fixed location are allocated to a PBCH or PCH. The ECCEs (or EREGs) at a fixed location may be the ECCEs (or EREGs) with a fixed logical address, such as an ECCE (or EREG) with a fixed ID or a fixed physical location, such as an ECCE (or EREG) with a fixed time-frequency resource location.

Figure 9:
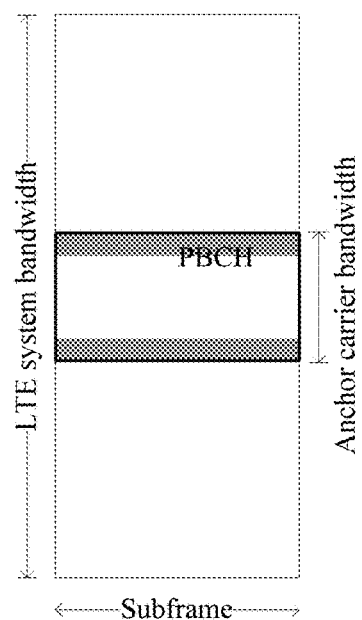
FIG. 9 is another schematic diagram of a physical channel of a subcarrier according to an embodiment of the present invention.

Optionally, an MUE and an NUE on each subcarrier share a PBCH defined within a range of the anchor carrier. Optionally, on the Legacy carrier, the subcarrier may reuse an existing PBCH. On the NCT, one manner is that a PBCH occupies two PRB resources and performs multiplexing, in a frequency division multiplexing (FDM) manner, with other channels in a bandwidth range of the anchor carrier, as shown in grey areas in FIG. 9; another manner is that resources at several fixed locations are occupied at a granularity of an EREG or ECCE, where the fixed locations are the same as defined above. Information carried in a PBCH may indicate whether a current subcarrier supports an MUE communication mode.

Optionally, each subcarrier has a PCH that is used by the MUE. PCH scheduling information, whether on the Legacy carrier or the NCT, is sent by an EPDCCH, and data information carried in the scheduling information is carried by a PDSCH. A system may allocate a time-frequency resource at a granularity of an ECCE (EREG) to the PDSCH that carries data information of a PCH. Alternatively, when a user accepts the PCH, there is no need to detect the EPDCCH to acquire its scheduling information; the PCH is detected at an agreed fixed location, where the fixed location is the same as defined above. When system information carried by a PVC changes, each subcarrier synchronously sends the PCH or other broadcast information to notify all MUEs that are served by the current subcarrier. Each subcarrier has a same modification period (modification period).

In S110, the UE acquires, on the anchor carrier, synchronization information to synchronize with the base station.

Specifically, the UE needs to first perform synchronization before accessing the base station. In this embodiment of the present invention, one implementation manner is that a synchronization channel is carried on the anchor carrier and there is no synchronization channel on the supplementary channel. For example, in the LTE system, a primary synchronization signal (PSS) and a secondary synchronization signal (SSS) are both located at the center of the frequency spectrum of the LTE system, and each occupies one OFDM symbol, and a frequency domain length of 6 RBs. The anchor carrier may be located at the center of the frequency spectrum. The synchronization channel on the anchor carrier keeps consistent with the existing LTE system. The UE searches for a frequency. Because a synchronization channel is carried only on the anchor carrier, only the synchronization channel on the anchor carrier is found by the UE. Then, the UE synchronizes with the base station.

Another implementation manner is that all subcarriers carry a synchronization channel. Compared with the supplementary carrier, a relative frequency domain location of the synchronization channel on the anchor carrier is different from a relative frequency domain location, of a synchronization channel on the supplementary carrier; or the synchronization channel on the anchor carrier and the synchronization channel on the supplementary carrier use different synchronization sequences. When the UE searches for a frequency, it searches for the synchronization channel on the anchor carrier only. Therefore, only the anchor carrier at the central location is found by the UE. Then, the UE synchronizes with the base station.

In S120, the UE acquires, on the anchor carrier, system information.

After synchronizing with the base station, the UE receives system information on the anchor carrier, that is, the UE reads, on the anchor carrier, system information related to the UE.

In this embodiment of the present invention, optionally, to support the MUE communication mode, the system information includes one or more of the following information:

the number of subcarriers, information about an identity and a frequency location of each subcarrier, parameters $\Delta_{UL}$ and $\Delta_{DL}$ indicating an uplink spacing and a downlink spacing between the subcarriers; bandwidth of the CRS; SRS configuration information of the NUE; CSI-RS configuration information of the NUE, such as information about a period and bandwidth, where the CSI-RS includes a pilot that is defined in the 3rd Generation Partnership Project (3GPP) LTE Rel 11 and other pilots that are used to measure channel state information, such as a zero power (ZP) CSI-RS and a non-zero power (NZP) CSI-RS; unique configuration of a particular subcarrier, including an access probability of each subcarrier (a probability that is used to control a user to select a subcarrier, so as to implement load control); a frequency hopping indication and a frequency hopping period; radio resource configuration of the anchor carrier, including a reference signal (RS) transmit power, a system information modification period, where the radio resource configuration of the anchor carrier may be used as common resource configuration for all subcarriers, and the resource configuration is used by the UE to derive radio resource configuration of the supplementary carrier; cell reselection configuration information; and intra-frequency and inter-frequency measurement configuration information.

In S130, the UE selects the anchor carrier or one of the at least one supplementary carrier according to the system information.

After receiving the system information on the anchor carrier, the UE determines, according to the system information, a subcarrier among the subcarriers for communication with the base station.

S130 may be implemented such that a subcarrier is randomly selected among the subcarriers according to an identity of the UE and the identities of the subcarriers.

In this embodiment, a subcarrier that is used by the UE to access the base station is determined in a random manner. Each UE has a unique identity. The UE uses its identity to determine the subcarrier to be used. For example, an international mobile subscriber identity (IMSI) is used as a unique identity to identify a user, and an identity Index (identifying the subcarrier to be used) is determined according to the following equation:

Index=IMSI mod $N$, or

Index=$UE\_ID$ mod $N$, $UE\_ID$=IMSI mod 1024.

Then, the UE uses a subcarrier, among the N subcarriers, whose identity is Index as the subcarrier that is used to access the base station.

Optionally, S130 includes:

determining, according to the system information and receiving strength of a downlink signal, the subcarrier that is used to access the base station.

In this embodiment, the UE selects a subcarrier with high receiving strength of a downlink signal as the subcarrier that is used to access the base station.

In S140, the UE accesses the base station on the selected anchor carrier or supplementary carrier, and communicates with the base station.

Optionally, S140 includes:

sending an access request to the base station by using a physical random access channel (PRACH) on the selected subcarrier; and receiving an access response sent by the base station, and accessing the base station to perform communication.

Figure 10:
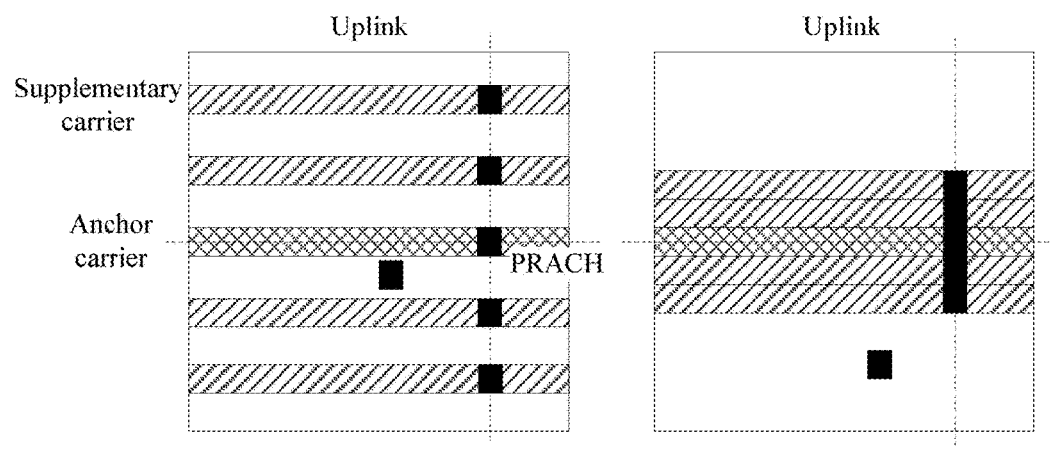
FIG. 10 is still another schematic diagram of a physical channel of a subcarrier according to an embodiment of the present invention.

In this embodiment of the present invention, each subcarrier has separate PRACH resource configuration. Optionally, a PRACH resource location of each subcarrier is derived from a PRACH resource location of an uplink anchor carrier. For example, a location of each PRACH is obtained by offsetting a carrier of a PRACH location of the anchor carrier. A size of an offset is a spacing between a center frequency of the supplementary carrier and a center frequency of the anchor carrier, as shown in FIG. 10. All subcarriers share a same preamble format.

To improve an anti-interference capability of the subcarriers and take advantage of a frequency domain diversity effect, a frequency hopping technology may be used when the UE communicates with the base station. Therefore, optionally, the system information includes information about a frequency hopping indication, a frequency hopping period, and a frequency hopping mode;

S140 includes the following:

the UE accesses the base station; determines, according to the frequency hopping mode and the frequency hopping period, a subcarrier to be used for communication with the base station at a next moment; and communicates with the base station by using the foregoing subcarrier at the next moment.

In other words, the UE determines, according to the obtained system information, whether frequency hopping will be performed. If the system information received by the UE includes information about a frequency hopping indication, a frequency hopping period, and a frequency hopping mode, the UE determines that frequency hopping will be performed. The UE determines a frequency hopping mode according to the frequency hopping mode information. Optionally, the frequency hopping mode information includes the number N of subcarriers; a current moment T (represented by a subframe number or frame number, or the like); cell identity (PCI); a subcarrier identity Index, where Index is an integer that meets $0 \leq \text{Index} \leq N-1$. A frequency hopping mode is determined according to the frequency hopping mode information. For example, a frequency hopping mode of the subcarrier whose identity is Index is (T+PCI+Index)mod N; that is, at the T moment, a frequency domain location of the subcarrier whose identity is Index is a location of a subcarrier whose identity is (T+PCI+Index) mod N when the frequency hopping is not performed.

When the frequency hopping is performed, the base station uses a corresponding frequency hopping mode to ensure that the base station normally communicates with the UE.

Optionally, in S140, when the base station communicates with the UE, the base station sends data of multiple UEs on a physical downlink shared channel (PDSCH). The UE selects, by using a logical identity, data that is sent to the UE itself.

Figure 11:
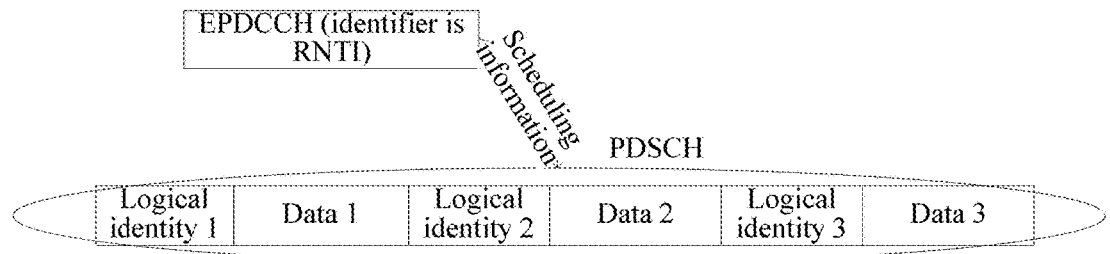
FIG. 11 is a schematic diagram illustrating mapping of a PDSCH packet according to an embodiment of the present invention.

Specifically, the base station maps the data of multiple UEs in a single PDSCH packet and distinguishes data of different UEs in the single packet by using a logical identity. A specific manner is that multiple UEs multiplexed on a same PDSCH channel have a same user identity, that is, a radio network temporary identifier (RNTI), and each UE uses this RNTI identifier to detect an EPDCCH and acquire scheduling information of the PDSCH. Meanwhile, each UE further has a logical identity. After correctly receiving data on the PDSCH, each UE determines its data information according to its own logical identity. As shown in FIG. 11, three UEs acquire scheduling information by detecting an EPDCCH of a same RNTI identifier. Each user acquires its own data according to its own logical identity.

Because transmission bandwidth of a signal used for an NUE communication mode, such as a CSI-RS, may span frequency spectrum resources of multiple subcarriers, the base station performs rate matching and data mapping, after removing a time-frequency resource that is occupied by the signal such as a CSI-RS. The UE acquires configuration information of the CSI-RS included in the system information, so as to receive data sent by the base station.

Optionally, the system information includes configuration information of a sounding reference signal (SRS) that is used for NUE communication;

in S140, when the base station communicates with the UE, the UE sends, according to the configuration information of the SRS, uplink data to the base station by using an uplink subframe of a subcarrier, where a resource occupied by the SRS is removed from the uplink subframe of the subcarrier.

Specifically, an NUE served by the LTE system may configure and send a periodic or non-periodic SRS in the uplink. In different configurations of the SRS, transmission bandwidth occupied by the SRS and a transmission period are also different. In addition, a frequency hopping mode of the SRS within bandwidth of the LTE system may lead to a resource conflict between a transmission resource of the SRS and an uplink carrier of the subcarrier. Therefore, for an MUE served by the subcarrier, it is necessary to acquire the configuration information of the SRS. An MUE does not send any uplink signal at an SRS resource location of the LTE system. The MUE performs rate matching on resources, except resources occupied by channels such as the SRS, in an uplink subframe of the subcarrier.

In the frequency hopping mode, both receiving of downlink data and sending of uplink data by the UE need to be performed at a subcarrier location determined by the frequency hopping mode for a corresponding moment. Therefore, optionally, in S140, when the base station communicates with the UE, the UE performs frequency hopping according to the frequency hopping mode and the frequency hopping period.

For the base station, frequencies of all subcarriers are within a range of a baseband and radio frequency processing bandwidth of the base station. Therefore, for the base station, frequency hopping is merely a change of signal data symbol mapping during baseband processing, that is, a baseband signal of a single subcarrier selects, according to the frequency hopping mode, some subcarriers to perform mapping. For the MUE served by the subcarrier, a broadband radio frequency may be used for receiving; and some OFDM subcarriers are selected according to the frequency hopping mode to perform baseband signal processing. Alternatively, for the MUE, a narrowband radio frequency is used for receiving; in the frequency hopping mode, when the UE uses a subcarrier other than a subcarrier located at a central location of the frequency spectrum of the LTE system, the frequency hopping is performed according to an agreed frequency hopping mode and period. For the anchor carrier that is located at the central location, the frequency hopping may be performed for some subframes, and not performed for some other subframes. Specifically, in addition to sent subframes which are located in a frequency spectrum resource and are used by all MUEs for physical channels such as a PBCH, PCH, synchronization channel (SCH), and PDSCH that carries SI, other subframes also perform the frequency hopping according to the agreed mode and period.

Figure 12:
FIG. 12 is a schematic diagram of a frequency hopping mode according to an embodiment of the present invention.

Frequency spectrum resources used by all physical channels of subcarriers in the frequency hopping mode have a same frequency hopping mode. A frequency hopping interval may be an agreed value; or a value of the interval may be obtained by a terminal by reading the system information. The frequency hopping mode is determined by the frequency hopping mode information. For details, refer to the frequency hopping mode described above; details are not described herein again. A schematic diagram of the frequency hopping mode is shown in a manner 1 in FIG. 12. In a non-frequency hopping mode, none of the subcarriers performs the frequency hopping, as shown in a manner 2 in FIG. 12. According to the communication method in this embodiment of the present invention, the system information is received from the anchor carrier among the N subcarriers, and a subcarrier among the N subcarriers is selected according to the system information to perform communication with the base station, so that communication with more MUEs may be supported, and system capacity may be expanded.

In this embodiment of the present invention, optionally, the system information further includes bandwidth of a CRS. The method 100 further includes the following:

the UE determines a CRS sequence of the selected subcarrier according to a frequency location of the selected subcarrier and the bandwidth of the CRS.

In this embodiment of the present invention, the UE uses a CRS to implement synchronous tracking of a downlink signal.

To implement synchronous tracking of a downlink signal, the UE needs to acquire the CRS sequence on the selected subcarrier, that is, a corresponding CRS sequence is intercepted according to a location of the subcarrier relative to the bandwidth of the CRS. Optionally, the UE may acquire the bandwidth of the CRS from the system information sent by the base station; or, the base station and the UE may also agree on the bandwidth of the CRS.

To enable UEs on all subcarriers to acquire a CRS sequence, a bandwidth of the CRS needs to meet a condition that a frequency spectrum resource of each subcarrier is within a bandwidth range of the individual subcarrier.

In this embodiment of the present invention, optionally, the method 100 further includes the following:

when the UE is in an idle state, the UE camps on the selected supplementary carrier or anchor carrier.

Specifically, when the UE is in an idle state, the UE selects a subcarrier to camp on. Optionally, when the frequency hopping is not performed, the UE may camp on any selected subcarrier; when the frequency hopping is performed, the UE camps on the anchor carrier.

In this embodiment of the present invention, optionally, the method 100 further includes the following:

the UE receives, on the selected subcarrier, notification information that is sent by the base station when the system information changes; and the UE receives, on the anchor carrier and according to the notification information, the changed system information.

Specifically, when the system information changes, the base station sends the notification information on all the subcarriers, such as a Paging message, which indicates that the SI changes; after receiving this notification message, the UE receives, on the anchor carrier, changed system information.

In this embodiment, optionally, the method 100 further includes the following:

if the UE is in a connected state when the notification information is received, the UE returns to an original subcarrier after receiving the changed system information; or if the UE is in an idle state when the notification information is received, the UE camps on the anchor carrier after receiving the changed system information; or if the UE is in an idle state when the notification information is received, the UE returns to an original subcarrier after receiving the changed system information.

In this embodiment of the present invention, optionally, the method 100 further includes the following:

the UE receives a handover command sent by the base station, where the handover command carries system information of a target cell; and the UE synchronizes with a target base station on an anchor carrier of the target cell according to the system information of the target cell, and accesses the target base station on the anchor carrier.

When the UE needs to perform a handover from a subcarrier of a source cell to a subcarrier of a target cell, the UE needs to acquire system information of the target cell. The system information of the target cell includes one or more of the following information:

an identity of a target subcarrier; the number N of subcarriers of the target cell; parameters $\Delta UL$ and $\Delta DL$ indicating an uplink spacing and a downlink spacing between the subcarriers of the target cell; SRS configuration information of an NUE in the target cell; CSI-RS configuration information of the NUE in the target cell, such as information about a period and bandwidth, where the CSI-RS includes a pilot that is defined in the 3GPP LTE Rel 11 and other pilots that are used to measure channel state information, such as a ZP CSI-RS and a NZP CSI-RS; identity information of the target cell, including a frequency, a cell identity, and the like; configuration information of the target subcarrier; a frequency hopping indication and a frequency hopping period; radio resource configuration of the anchor carrier of the target cell, including RS transmit power, an SI modification period; cell reselection configuration information of the target cell; and intra-frequency and inter-frequency measurement configuration information of the target cell.

In this embodiment, the UE acquires the system information of the target cell from the source base station. A handover command that is sent by the source base station to the UE carries the system information of the target cell; the UE acquires the system information of the target cell from the handover command; and the UE synchronizes with the target base station according to the system information of the target cell, and accesses the target base station.

In this embodiment of the present invention, optionally, the method 100 further includes the following:

the UE receives a handover command sent by the base station, where the handover command carries identity information of a target cell and identity information of a target cell anchor carrier of the target cell;

the UE acquires, on an anchor carrier of the target cell, system information of the target cell according to the identity information of the target cell and the identity information of the target cell anchor carrier of the target cell; and the UE accesses, on the anchor carrier of the target cell, a base station of the target cell according to the system information of the target cell.

In this embodiment, the UE acquires the system information of the target cell from the target base station. The handover command that is sent by the source base station to the UE carries only the identity information of the target cell and the identity information of the anchor carrier of the target cell, such as a frequency of the target cell, the cell identity, and identity information of a target subcarrier. The UE acquires the system information of the target cell according to the identity information of the target cell and the identity information of the anchor carrier of the target cell, and accesses the base station of the target cell according to the system information of the target cell.

In this embodiment of the present invention, optionally, the system information includes cell reselection configuration information.

the cell reselection configuration information includes intra-frequency cell reselection configuration information or inter-frequency cell reselection configuration information, where the intra-frequency cell reselection configuration information indicates a cell identity that may support the MUE communication mode, and the inter-frequency cell reselection configuration information indicates a frequency and a cell identity that may support the MUE communication mode.

Optionally, the system information includes intra-frequency measurement configuration information or inter-frequency measurement configuration information, where the intra-frequency measurement configuration information indicates a cell identity that may support the MUE communication mode, and the inter-frequency measurement configuration information indicates a cell identity and a frequency that may support the MUE communication mode.

Figure 13:
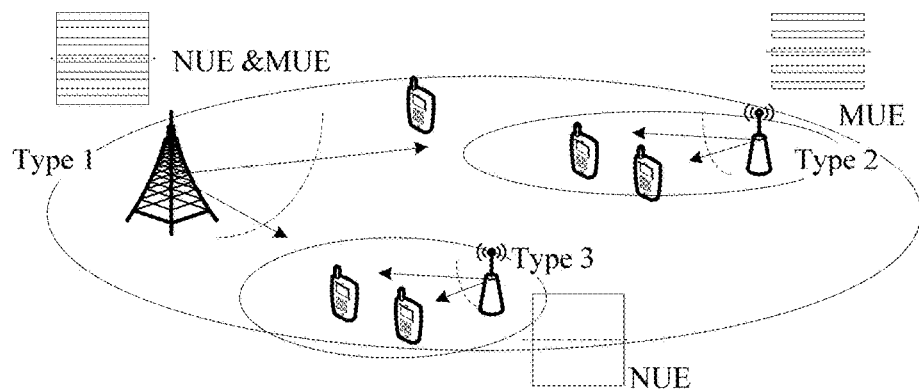
FIG. 13 is a schematic diagram illustrating types of a base station according to an embodiment of the present invention.

Specifically, as shown in FIG. 13, there may be three types of base stations in an actual scenario:

The type 1 base station can define two communications systems on a same frequency spectrum resource, which support the MUE and NUE communication mode respectively; the type 2 base station defines only one communications system on a given frequency spectrum resource and only supports the MUE communication mode; and the type 3 base station defines only one communications system on a given frequency spectrum resource and only supports the NUE communication mode.

For the MUE, the type 3 base station may not support MUE communication; therefore, cell reselection configuration information in system information of the type 1 and type 2 cells needs to notify the MUE of cell information that is available for reselection. The intra-frequency cell reselection configuration information in the system information indicates a cell identity that may support the MUE communication mode; and the inter-frequency cell reselection configuration information in the system information indicates a frequency and a cell identity that may support the MUE communication mode.

For the NUE, cell reselection configuration in system information of the type 1 and type 3 cells needs to notify the NUE of cell information that is available for reselection. The intra-frequency cell reselection configuration information in the system information indicates a cell identity that may support the NUE communication mode; and the inter-frequency cell reselection configuration information in the system information indicates a frequency and a cell identity that may support the NUE communication mode.

Alternatively, for the NUE, cell reselection configuration in system information of the type 1, type 2, and type 3 cells needs to notify the NUE of cell information that is available for reselection. The intra-frequency cell reselection configuration information in the system information indicates a cell identity that may support the MUE communication mode and a cell identity that may support the NUE communication mode; the inter-frequency cell reselection configuration information in the system information indicates a frequency and a cell identity that may support the MUE communication mode, and a frequency and a cell identity that may support the NUE communication mode.

Intra-frequency measurement configuration information of the MUE indicates a cell identity, such as a PCI, which may support the MUE communication mode; and inter-frequency measurement configuration information of the MUE indicates a cell identity, a frequency, and the like that may support the MUE communication mode. Intra-frequency measurement configuration information of the NUE indicates a cell identity that may support the NUE communication mode, or a cell identity that may support the NUE communication mode and a cell identity that may support the MUE communication mode; inter-frequency measurement configuration information of the NUE indicates a cell identity, a frequency, and the like that may support the NUE communication mode, or further indicates a cell identity, a frequency, and the like that may support the MUE communication mode.

The base station has information about whether a neighboring cell supports the MUE or NUE communication mode. A manner of acquiring the information is to acquire a communication type that the neighboring cell supports by means of communication between base stations, where the communication type is at least one of the type 1, type 2, and type 3. Alternatively, the terminal acquires, by reading a PBCH of the neighboring cell or the system information, a communication type supported by the neighboring cell, and reports a cell identity of the neighboring cell and the communication type supported by the neighboring cell to a current serving cell.

The intra-frequency measurement configuration information or inter-frequency measurement configuration information may also be sent by using dedicated signaling. Therefore, optionally, the method 100 further includes the following:

the UE receives intra-frequency measurement configuration information or inter-frequency measurement configuration information sent by the base station, where the intra-frequency measurement configuration information indicates a cell identity that may support the MUE communication mode, and the inter-frequency measurement configuration information indicates a cell identity and a frequency that may support the MUE communication mode.

When the UE supports both the MUE communication mode and the NUE communication mode, that is, the UE may be an MUE and may also be an NUE, the UE may switch between the MUE communication mode and the NUE communication mode. Therefore, in this embodiment of the present invention, optionally, the method 100 further includes the following:

the UE acquires system information corresponding to the NUE communication mode, and establishes an NUE communication connection with the base station.

Optionally, the method 100 further includes the following:

when the UE is in the NUE communication mode, if the UE receives a communication mode switching message that is sent by the base station, or does not receive scheduling information within a preset time, the UE accesses the base station on a subcarrier among the N subcarriers; and the UE sends a communication mode switching success message to the base station, so that the base station releases resource configuration of the NUE communication mode.

Specifically, the MUE communication mode requires relatively low power; therefore, a communication mode of the MUE may also be used for the NUE, so that a user can work in the MUE communication mode to reduce power consumption and extend standby time.

After establishing a radio resource control protocol (RRC) connection with the base station, the UE reports its own capability, which indicates that the UE may support the NUE communication mode, the MUE communication mode, or both.

A switch from the MUE communication mode to the NUE communication mode is as follows:

the UE reads system information corresponding to the NUE communication mode and establishes a connection with the base station by using a physical resource request defined by the NUE communication mode. Then, an identity used by the UE for the MUE communication mode is reported to the base station; the base station releases corresponding resource configuration of the UE in the MUE communication mode, so as to enable the UE to switch from the MUE communication mode to the NUE communication mode.

A switch from the NUE communication mode to the MUE communication mode is as follows:

The base station notifies, by using the communication mode switching message, the UE to switch from the NUE communication mode to the MUE communication mode. For example, the base station notifies, by using a physical layer signaling or a Media Access Control (MAC) control element (CE) or the like, the UE to switch from the NUE communication mode to the MUE communication mode. The UE switches to MUE communication, that is, the UE accesses the base station on a subcarrier among the N subcarriers. After a switch of communication mode is successful, the UE reports a result to the base station; then the base station releases resource configuration of the UE in the NUE communication mode.

Alternatively, if the UE does not receive scheduling information within a preset time, the UE switches from the NUE communication mode to the MUE communication mode. For example, a timer TimerX is defined; if the UE does not acquire any scheduling information during a period from when the timer starts countdown to when a timeout period defined by the timer expires, the UE automatically switches from the NUE communication mode to the MUE communication mode. Optionally, the base station also maintains a timer. After the UE switches from the NUE communication mode to the MUE communication mode, the base station releases resource configuration occupied by the UE in the NUE communication mode.

Optionally, the UE reports power information of a terminal, such as remaining power of the terminal. The base station uses this information to help determine whether to trigger a switch of communication mode for the UE.

According to the communication method in this embodiment of the present invention, one of the N subcarriers distributed in a time-frequency resource is connected to perform communication with the base station, which can expand system capacity and better support M2M communication.

The foregoing provides an embodiment in which the subcarriers are defined within the resources of the LTE system. Here, another case is described, where within a given frequency spectrum resource, only the MUE communication mode is supported. In this scenario, the anchor carrier and the supplementary carrier are separately carried by different base stations. All UEs in a cell coverage area, which is formed by a coverage range of the anchor carrier, receive system information from the base station. The UE communicates with the base station by using the foregoing method.

Figure 14:
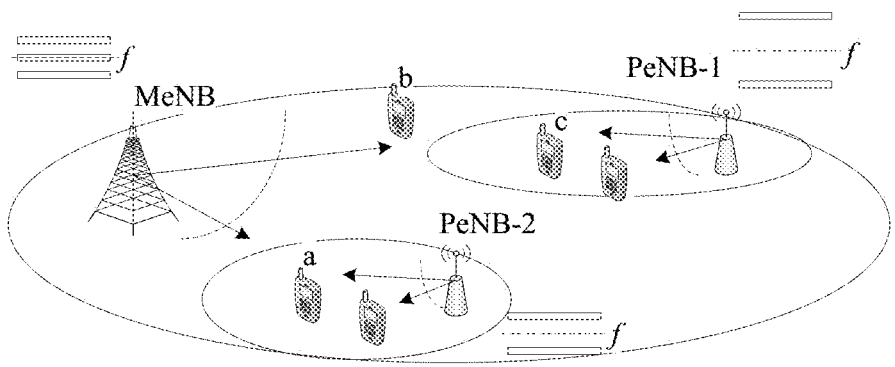
FIG. 14 is a schematic diagram of a communications system according to an embodiment of the present invention.

For example, an f frequency shown in FIG. 14 defines a center frequency of the subcarrier. Three base stations, that is, a macro base station (MeNB), and micro base stations (PeNB)-1 and PeNB-2, are included in a cell coverage area which is formed by a coverage range of the anchor carrier at this location. The anchor carrier is configured on the MeNB. Other base stations (such as the PeNB-1 and the PeNB-2) in the cell may carry all or some of the supplementary carriers. Users a, b, and c in the figure all receive system information that is sent by the anchor carrier carried by the MeNB. Respective supplementary carriers of the users a, b, and c are carried by the PeNB-2, the MeNB, and the PeNB-1 respectively.

With reference to FIG. 1 to FIG. 14, the communication method is described above in detail in this embodiment of the present invention. The following further describes, with reference to the accompanying drawings, apparatus embodiments of a UE and a base station for implementing the method or steps in the foregoing method embodiment. For a detailed implementation of some steps, refer to the foregoing method embodiment, and details are not described again in the apparatus embodiments.

Figure 15:
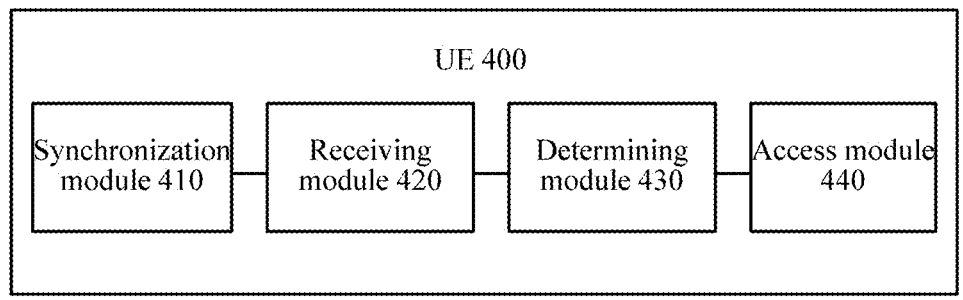
FIG. 15 is a schematic structural diagram of a UE according to an embodiment of the present invention.

FIG. 15 shows a schematic structural diagram of a UE 400 according to an embodiment of the present invention. As shown in FIG. 15, the UE 400 includes:

a synchronization module 410, configured to acquire, on an anchor carrier, synchronization information to synchronize with a base station, where a frequency resource between the UE and the base station includes N subcarriers, where the N subcarriers include the anchor carrier and at least one supplementary carrier, and N is an integer greater than or equal to 2;

a receiving module 420, configured to acquire, on the anchor carrier, system information, where the system information includes information about identities and frequency locations of the subcarriers;

a determining module 430, configured to select the anchor carrier or a supplementary carrier according to the system information; and an access module 440, configured to access the base station on a selected subcarrier, and communicate with the base station.

The UE in this embodiment of the present invention receives the system information on the anchor carrier, accesses the base station on a subcarrier and communicates with the base station, which can expand system capacity and better support M2M communication.

In this embodiment of the present invention, optionally, the anchor carrier may be located at a central location of a working frequency of an LTE system. For distribution of each subcarrier on a frequency and a physical channel carried by each subcarrier, refer to the foregoing method embodiment, and details are not described herein again.

The determining module 430 is specifically configured to randomly select a subcarrier among the subcarriers according to an identity of the UE and the identities of the subcarriers.

In another optional manner, the determining module 430 is specifically configured to select a subcarrier with high receiving strength of a downlink signal as a subcarrier that is used to access the base station.

In this embodiment of the present invention, optionally, the system information further includes information about a frequency hopping indication, a frequency hopping period, and a frequency hopping mode;

the access module 440 is specifically configured to determine, according to the frequency hopping mode and the frequency hopping period, a location of a subcarrier used to communicate with the base station at a next moment; and communicate, at the next moment, with the base station by using the foregoing subcarrier.

In this embodiment of the present invention, optionally, the access module 440 includes:

a sending unit, configured to send an access request to the base station by using a physical random access channel (PRACH) on the selected subcarrier; and a receiving unit, configured to receive, on the selected subcarrier, an access response sent by the base station.

In this embodiment of the present information, optionally, the receiving module 420 is further configured to receive, on the selected subcarrier, notification information that is sent by the base station when the system information changes, and receive, on the anchor carrier and according to the notification information, the changed system information.

In the foregoing embodiment, optionally, the UE 400 further includes:

a migrating module, configured to return to an original subcarrier in the case in which the receiving module 420 is in a connected state when receiving the notification information, or configured to camp on the anchor carrier in the case in which the receiving module 420 is in an idle state when receiving the notification information, or configured to return to an original subcarrier in the case in which the receiving module 420 is in an idle state when receiving the notification information.

In this embodiment of the present invention, optionally, the receiving module 420 is further configured to receive a handover command sent by the base station, where the handover command carries system information of a target cell;

the UE 400 further includes:

a first handover module, configured to synchronize, according to the system information of the target cell, with a target base station on an anchor carrier of the target cell, and access the target base station on the anchor carrier.

In this embodiment of the present invention, optionally, the receiving module 420 is further configured to receive a handover command sent by the base station, where the handover command carries identity information of the target cell and identity information of a target cell anchor carrier of the target cell;

the UE 400 further includes:

a second handover module, configured to acquire, on the anchor carrier of the target cell, the system information of the target cell according to the identity information of the target cell and the identity information of the target cell anchor carrier of the target cell; and access the target base station on the anchor carrier of the target cell according to the system information of the target cell.

In this embodiment of the present invention, optionally, the system information includes cell reselection configuration information;

the cell reselection configuration information includes intra-frequency cell reselection configuration information or inter-frequency cell reselection configuration information, where the intra-frequency cell reselection configuration information indicates a cell identity that may support a machine user equipment MUE communication mode, and the inter-frequency cell reselection configuration information indicates a frequency and a cell identity that may support the MUE communication mode.

In this embodiment of the present invention, optionally, the system information includes intra-frequency measurement configuration information or inter-frequency measurement configuration information, where the intra-frequency measurement configuration information indicates a cell identity that may support the MUE communication mode, and the inter-frequency measurement configuration information indicates a cell identity and a frequency that may support the MUE communication mode.

In this embodiment of the present invention, optionally, the receiving module 420 is further configured to receive intra-frequency measurement configuration information or inter-frequency measurement configuration information sent by the base station, where the intra-frequency measurement configuration information indicates a cell identity that may support the MUE communication mode, and the inter-frequency measurement configuration information indicates a cell identity and a frequency that may support the MUE communication mode.

In this embodiment of the present invention, optionally, the UE 400 further includes:

an acquiring module, configured to acquire bandwidth of a CRS; and determine a CRS sequence of the selected subcarrier according to a frequency location of the selected subcarrier and the bandwidth of the CRS.

In this embodiment of the present invention, optionally, the system information includes configuration information of a sounding reference signal SRS that is used for a normal user equipment NUE communication mode;

the access module 440 is specifically configured to send, according to the configuration information of the SRS, uplink data to the base station by using an uplink subframe of a subcarrier, where a resource occupied by the SRS is removed from the subcarrier.

The UE according to this embodiment of the present invention may correspond to the UE in the communication method according to the foregoing embodiment of the present invention; and the foregoing and other operations or functions of each module in the UE 400 are intended to implement corresponding procedures of various methods in FIG. 1 to FIG. 14. For brevity, details are not described herein again.

The UE in this embodiment of the present invention communicates with the base station by accessing a subcarrier among the N subcarriers distributed in a time-frequency resource, which can expand system capacity and better support M2M communication.

It should be noted that, a specific hardware structure of the UE in this embodiment may also be in a form in which a processor cooperates with a transceiver and a memory. The processor may invoke a program in the memory to implement functions of modules in this embodiment, such as the synchronization module 410, the determining module 430, the access module 440, the migrating module, the first handover module, the second handover module, and the acquiring module. In a specific application, the hardware structure of the UE may be flexibly changed according to a usage scenario, which is not limited in the present invention.

Figure 16:
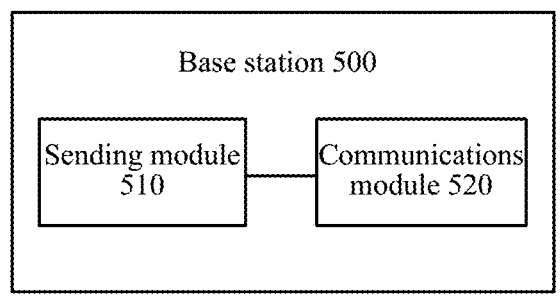
FIG. 16 is a schematic structural diagram of a base station according to an embodiment of the present invention.

FIG. 16 is a schematic structural diagram of a base station 500 according to an embodiment of the present invention. As shown in FIG. 16, the base station 500 includes:

a sending module 510, configured to send synchronization information to a UE on an anchor carrier, so as to enable the UE to synchronize with the base station, where a frequency resource between the UE and the base station includes N subcarriers, where the N subcarriers include the anchor carrier and at least one supplementary carrier, and N is an integer greater than or equal to 2; the sending module 510 is further configured to send system information to the UE on the anchor carrier, where the system information includes information about identities and frequency locations of the N subcarriers, so that the UE selects the anchor carrier or a supplementary carrier according to the system information; and a communications module 520, configured to enable, on a subcarrier selected by the UE, the UE to access the base station; and communicate with the UE.

The base station in this embodiment of the present invention sends the system information on the anchor carrier among the N subcarriers, so that the UE accesses the base station on a subcarrier and communicates with the base station. In this way, communication with more MUEs may be supported, and system capacity is expanded, thereby better supporting M2M communication.

In this embodiment of the present invention, the anchor carrier may be located at a central location of a working frequency of an LTE system. For distribution of each subcarrier on a frequency and a physical channel carried by each subcarrier, refer to the foregoing method embodiment, and details are not described herein again.

In this embodiment of the present invention, optionally, the system information further includes information about a frequency hopping indication, a frequency hopping period, and a frequency hopping mode.

Optionally, the communications module 520 is specifically configured to communicate with the UE according to the frequency hopping mode and the frequency hopping period.

In this embodiment of the present invention, optionally, the sending module 510 is further configured to send, on the N subcarriers, notification information when the system information changes, so that the UE receives, on the anchor carrier, the changed system information.

In this embodiment of the present invention, optionally, the sending module 510 is further configured to send a handover command to the UE, where the handover command carries system information of a target cell, so that the UE synchronizes with a target base station on an anchor carrier of the target cell, and accesses the target base station on the anchor carrier.

In this embodiment of the present invention, optionally, the sending module 510 is further configured to send a handover command to the first UE, where the handover command carries identity information of a target cell and identity information of an anchor carrier of the target cell, so that the first UE accesses a target base station on the anchor carrier of the target cell according to the system information of the target cell.

In this embodiment of the present invention, optionally, the system information includes cell reselection configuration information;

the cell reselection configuration information includes intra-frequency cell reselection configuration information or inter-frequency cell reselection configuration information, where the intra-frequency cell reselection configuration information indicates a cell identity that may support a machine user equipment MUE communication mode, and the inter-frequency cell reselection configuration information indicates a frequency and a cell identity that may support the MUE communication mode.

In this embodiment of the present invention, optionally, the system information includes intra-frequency measurement configuration information or inter-frequency measurement configuration information, where the intra-frequency measurement configuration information indicates a cell identity that may support the MUE communication mode, and the inter-frequency measurement configuration information indicates a cell identity and a frequency that may support the MUE communication mode.

In this embodiment of the present invention, optionally, the sending module 510 is further configured to send intra-frequency measurement configuration information or inter-frequency measurement configuration information to a first UE, where the intra-frequency measurement configuration information indicates a cell identity that may support the MUE communication mode, and the inter-frequency measurement configuration information indicates a cell identity and a frequency that may support the MUE communication mode.

In this embodiment of the present invention, optionally, the system information includes bandwidth of a CRS.

In this embodiment of the present invention, optionally, the communications module 520 is specifically configured to send data of multiple UEs on a same physical downlink shared channel PDSCH, that is, to map the data of the multiple UEs into a single PDSCH packet and send the packet to the UEs, where the multiple UEs have different logical identities.

In this embodiment of the present invention, optionally, the system information includes configuration information of a channel state information-reference signal CSI-RS that is used for a normal user equipment NUE communication mode;

the communications module 520 is specifically configured to communicate with the UE on a subcarrier, where a resource occupied by the CSI-RS is removed from the subcarrier.

In this embodiment of the present invention, optionally, the system information includes configuration information of a detection measurement signal SRS that is used for an NUE communication mode;

the communications module 520 is specifically configured to receive, on an uplink subframe of a subcarrier, uplink data sent by the UE, where a resource occupied by the SRS is removed from the subcarrier.

In this embodiment of the present invention, optionally, the base station 500 further includes:

a communications mode switching module, configured to establish an NUE communication connection with the UE; and a releasing module, configured to release a resource of the UE on the subcarrier.

In this embodiment of the present invention, optionally, the sending module 510 is further configured to send a communication mode switching message to the UE that is in the NUE communication mode, so that the UE accesses the base station on a subcarrier;

the base station 500 further includes:

a receiving module, configured to receive a communication mode switching success message sent by the UE; and a releasing module, further configured to release, according to the communication mode switching success message, a resource of the UE in the NUE communication mode.

In this embodiment of the present invention, optionally, the sending module 510 is further configured to send second system information to a second UE that is in the NUE communication mode, where the second system information includes configuration information of the N subcarriers, so that the second UE shares a time-frequency resource with the first UE according to the second system information.

In this embodiment of the present invention, optionally, the base station 500 further includes:

an acquiring module, configured to acquire user capability information of the second UE; and a configuration module, configured to determine and configure a type of a switching transmitter of the second UE according to the user capability information of the second UE, so that the second UE shares an uplink frequency spectrum resource with the first UE.

The base station in this embodiment of the present invention sends the system information on the anchor carrier among the N subcarriers, so that the MUE accesses to the base station on a subcarrier and communicates with the base station, thereby better supporting M2M communication. In addition, the base station also sends configuration information of the subcarrier to the NUE and configures the NUE to switch a transmitter type, which may enable the MUE and the NUE to share a frequency spectrum resource, thereby increasing a system capacity.

It should be noted that, a specific hardware structure of the base station in this embodiment may also be in a form in which a processor cooperates with a transceiver and a memory. The processor may invoke a program in the memory to implement functions of modules in this embodiment, such as the communications module 520, the communications mode switching module, the releasing module, and the configuration module; and the transceiver may implement transmission and receiving of information. In a specific application, the hardware structure of the base station may be flexibly changed according to a usage scenario, which is not limited in the present invention.

Based on the foregoing descriptions of the embodiments, a person skilled in the art may clearly understand that the present invention may be implemented by hardware, firmware, or a combination thereof. If the present invention is implemented by software, the foregoing functions may be stored in a computer-readable medium or are transmitted to the computer-readable medium in a form of one or more instructions or code. The computer-readable medium is either a computer storage medium or a communications medium, where the communications medium includes any medium that enables a computer program to be transmitted from one place to another. The storage medium may be any available medium that may be accessed by a computer. For example, such a computer-readable medium may include but is not limited to a RAM, a ROM, an EEPROM, a CD-ROM or another optical disc storage, a magnetic disk storage medium or another magnetic storage device, or any other medium that may be used to carry or store program code in an expected form of an instruction or a data structure and that can be accessed by a computer. Moreover, any connection may be appropriately defined as a computer-readable medium. For example, if software is transmitted from a website, a server, or another remote source by using a coaxial cable, an optical fiber cable, a twisted pair, a digital subscriber line (DSL) or a wireless technology, such as infrared, radio, or microwave, the coaxial cable, the optical fiber cable, the twisted pair, or the wireless technology, such as infrared, radio, and microwave, are included in the defined medium. The disk and the disc in the present invention include a compressed disk, a laser disk, an optical disc, a digital versatile disc (DVD), a floppy disk, and a blue-ray disk. The disk generally copies data by a magnetic means, and the disc generally copies data optically by a laser means. The foregoing combination may also be included in the computer-readable medium.

The foregoing descriptions are merely exemplary implementations of the present invention, but are not intended to limit the protection scope of the present invention. Any modification, equivalent replacement, and improvement made without departing from the spirit and principle of the present invention should fall within the protection scope of the present invention.

What is claimed is:

1. A communication method, comprising:

acquiring, by a user equipment (UE), on an anchor carrier, synchronization information to synchronize with a base station, wherein a frequency resource between the UE and the base station comprises N subcarriers, wherein the N subcarriers comprise the anchor carrier and at least one supplementary carrier, wherein at least one first subcarrier of the N subcarriers is non-orthogonal with a second subcarrier of the N subcarriers, and wherein N is an integer greater than or equal to 2;

acquiring, by the UE, on the anchor carrier, system information, wherein the system information comprises information about identities and frequency locations of the subcarriers;

selecting, by the UE, one of the anchor carrier or a supplementary carrier according to the system information; and accessing, by the UE, on a selected subcarrier, the base station, and communicating with the base station;

wherein a spacing between a downlink center frequency of the supplementary carrier and a downlink center frequency of the anchor carrier is an integral multiple of a frequency domain width of a resource block (RB);

wherein a spacing between an uplink center frequency of the supplementary carrier and an uplink center frequency of the anchor carrier is an integral multiple of the frequency domain width of the RB; and wherein the downlink center frequency of the anchor carrier coincides with a downlink center frequency of a Long Term Evolution (LTE) system, and wherein the downlink center frequency of the supplementary carrier coincides with an orthogonal frequency division multiplexing (OFDM) subcarrier of the LTE system.

2. The method according to claim 1, wherein the N subcarriers have a same bandwidth and are evenly distributed on a frequency, and wherein an offset of an uplink frequency relative to a downlink frequency of a subcarrier, among the N subcarriers, that deviates from the anchor carrier by i subcarriers is $W_{UL\text{-}DL}+i(\Delta_{UL}-\Delta_{DL})$, wherein $W_{UL\text{-}DL}$ is an offset of an uplink frequency relative to a downlink frequency of the anchor carrier, $\Delta_{UL}$ is an uplink frequency spacing between the N subcarriers, and $\Delta_{DL}$ is a downlink frequency spacing between the N subcarriers.

3. The method according to claim 1, wherein the selecting, by the UE, one of the anchor carrier or a supplementary carrier according to the system information comprises randomly selecting, by the UE, one of the subcarriers according to an identity of the UE and identities of the subcarriers.

4. The method according to claim 1, wherein the system information further comprises information about a frequency hopping indication, a frequency hopping period, and a frequency hopping mode; and wherein the communicating, by the UE, with the base station comprises:

determining, by the UE according to the frequency hopping mode and the frequency hopping period, a subcarrier used to communicate with the base station at a next time period; and communicating, by the UE at the next time period, with the base station by using the determined subcarrier.

5. The method according to claim 1, wherein the communicating, by the UE, with the base station comprises:

receiving, by the UE on a physical downlink shared channel (PDSCH), a packet sent by the base station to the UE and to at least one other receiving station, wherein the packet comprises first data mapped to the UE and second data that is mapped to the at least one other receiving station and that is separate from the first data; and selecting, by using a logical identity of the UE, the first data that is mapped to the UE.

6. A user equipment (UE) comprising a computer including a non-transitory computer-readable medium storing program modules executable by the computer, the modules including:

a synchronization module, configured to acquire, on an anchor carrier, synchronization information to synchronize with a base station, wherein a frequency resource between the UE and the base station comprises N subcarriers, wherein the N subcarriers comprise the anchor carrier and at least one supplementary carrier, wherein at least one first subcarrier of the N subcarriers is non-orthogonal with a second subcarrier of the N subcarriers, and wherein N is an integer greater than or equal to 2;

a receiving module, configured to acquire, on the anchor carrier, system information, wherein the system information comprises information about identities and frequency locations of the subcarriers;

a determining module, configured to select the anchor carrier or one of the supplementary carriers according to the system information; and an access module, configured to access, on a selected subcarrier, the base station, and communicate with the base station wherein a spacing between a downlink center frequency of the supplementary carrier and a downlink center frequency of the anchor carrier is an integral multiple of a frequency domain width of a resource block (RB);

wherein a spacing between an uplink center frequency of the supplementary carrier and an uplink center frequency of the anchor carrier is an integral multiple of the frequency domain width of the RB; and wherein the downlink center frequency of the anchor carrier coincides with a downlink center frequency of a Long Term Evolution (LTE) system, and wherein the downlink center frequency of the supplementary carrier coincides with an orthogonal frequency division multiplexing (OFDM) subcarrier of the LTE system.

7. The UE according to claim 6, wherein the determining module is configured to randomly select one of the subcarriers according to an identity of the UE and identities of the subcarriers.

8. The UE according to claim 6, wherein the system information further comprises information about a frequency hopping indication, a frequency hopping period, and a frequency hopping mode; and wherein the access module is further configured to determine, according to the frequency hopping mode and the frequency hopping period, a subcarrier used to communicate with the base station at a next time period, and further configured to communicate, at the next time period, with the base station by using the determined subcarrier.

9. The UE according to claim 6, wherein the access module comprises:

a sending unit, configured to send an access request to the base station by using a physical random access channel (PRACH) on the selected subcarrier; and a receiving unit, configured to receive, on the selected subcarrier, an access response sent by the base station.

10. The UE according to claim 6, wherein the receiving module is further configured to receive, on the selected subcarrier, notification information that is sent by the base station when the system information changes, and receive, according to the notification information and on the anchor carrier, the changed system information.

11. The UE according to claim 6, wherein the receiving module is further configured to receive a handover command sent by the base station, wherein the handover command carries system information of a target cell; and wherein the modules further include a first handover module, wherein the first handover module is configured to synchronize with a target base station according to the system information of the target cell and on an anchor carrier of the target cell, and is further configured to access, on the anchor carrier of the target cell, the target base station.

12. A base station comprising a computer including a non-transitory computer-readable medium storing program modules executable by the computer, the modules including:

a sending module, configured to send, on an anchor carrier, synchronization information to a user equipment (UE), so that the UE synchronizes with the base station, wherein a frequency resource between the UE and the base station comprises N subcarriers, wherein the N subcarriers comprise the anchor carrier and at least one supplementary carrier, wherein at least one first subcarrier of the N subcarriers is non-orthogonal with a second subcarrier of the N subcarriers, and wherein N is an integer greater than or equal to 2, wherein the sending module is further configured to send, on the anchor carrier, system information to the UE, wherein the system information comprises information about identities and frequency locations of the N subcarriers, so that the UE selects the anchor carrier or one of the supplementary carriers according to the system information; and a communications module, configured to enable, on a subcarrier selected by the UE, the UE to access the base station; and communicate with the UE;

wherein a spacing between a downlink center frequency of the supplementary carrier and a downlink center frequency of the anchor carrier is an integral multiple of a frequency domain width of a resource block (RB);

wherein a spacing between an uplink center frequency of the supplementary carrier and an uplink center frequency of the anchor carrier is an integral multiple of the frequency domain width of the RB; and wherein the downlink center frequency of the anchor carrier coincides with a downlink center frequency of a Long Term Evolution (LTE) system, and wherein the downlink center frequency of the supplementary carrier coincides with an orthogonal frequency division multiplexing (OFDM) subcarrier of the LTE system.

13. The base station according to claim 12, wherein the system information further comprises information about a frequency hopping indication, a frequency hopping period, and a frequency hopping mode; and wherein the communications module is further configured to communicate with the UE according to the frequency hopping mode and the frequency hopping period.

14. The base station according to claim 12, wherein the sending module is further configured to send, on the N subcarriers, notification information when the system information changes, so that the UE receives, on the anchor carrier, the changed system information.

15. The base station according to claim 12, wherein the sending module is further configured to send a handover command to the UE, wherein the handover command carries system information of a target cell so that the UE synchronizes, on an anchor carrier of the target cell, with a target base station, and accesses, on the anchor carrier of the target cell, the target base station.

16. The base station according to claim 12, wherein the system information further comprises bandwidth of a cell-specific reference signal (CRS).

17. The base station according to claim 12, wherein the communications module is further configured to map first data of the UE into a single physical downlink shared channel (PDSCH) packet according to a logical identifier of the UE, wherein the communications module is further configured to map, into the single PDSCH packet, according to a logical identifier of another receiving station, second data that is separate from the first data and that is of the another receiving station according, and wherein the communications module is further configured to send the packet to the UE and to the another receiving station.

18. The base station according to claim 12, wherein the system information further comprises configuration information of a channel state information-reference signal (CSI-RS) that is used for a normal user equipment NUE communication mode, wherein the normal user equipment is a user equipment that supports human to human communication; and wherein the communications module is further configured to communicate with the UE on a subcarrier selected by the UE, wherein a resource occupied by the CSI-RS is removed from the subcarrier.

* * * * *